United States Patent
Tokumo et al.

(10) Patent No.: US 9,254,745 B2
(45) Date of Patent: Feb. 9, 2016

(54) SHIFT CONTROL DEVICE FOR VEHICLE

(71) Applicant: MAZDA MOTOR CORPORATION, Hiroshima (JP)

(72) Inventors: Masayuki Tokumo, Hiroshima (JP); Yoh Yamazaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/627,352

(22) Filed: Feb. 20, 2015

(65) Prior Publication Data

US 2015/0266376 A1  Sep. 24, 2015

(30) Foreign Application Priority Data

Mar. 24, 2014  (JP) ................................. 2014-059736

(51) Int. Cl.
  *B60K 20/02*  (2006.01)
  *F16H 59/08*  (2006.01)
  *G05G 5/05*  (2006.01)

(52) U.S. Cl.
  CPC ................ *B60K 20/02* (2013.01); *F16H 59/08* (2013.01); *G05G 5/05* (2013.01); *F16H 2059/081* (2013.01)

(58) Field of Classification Search
  CPC .......... B60K 20/02; G05G 5/05; F16H 59/08; F16H 2059/081
  See application file for complete search history.

(56) References Cited

U.S. PATENT DOCUMENTS

| | | | |
|---|---|---|---|
| 2002/0016233 A1* | 2/2002 | Syamoto ................ | B60K 37/06 477/102 |
| 2013/0220055 A1* | 8/2013 | Curl ........................ | F16H 59/08 74/473.33 |
| 2014/0013889 A1* | 1/2014 | Yamamoto .............. | F16H 59/10 74/473.3 |
| 2015/0152958 A1* | 6/2015 | Watanabe ............... | F16H 59/08 74/473.12 |
| 2015/0167829 A1* | 6/2015 | Kim ........................ | F16H 59/08 74/473.12 |
| 2015/0226317 A1* | 8/2015 | Provenza ................ | F16H 59/08 74/473.21 |

FOREIGN PATENT DOCUMENTS

| | | | |
|---|---|---|---|
| JP | 2010-105621 A | 5/2010 |
| JP | 2010-105623 A | 5/2010 |

* cited by examiner

*Primary Examiner* — Drew Brown
(74) *Attorney, Agent, or Firm* — Studebaker & Brackett PC

(57) ABSTRACT

There are provided an operational member and a body portion supporting the operational member rotatably, clockwise or counterclockwise, from a home position and movably in a vehicle longitudinal direction from its rotated position. The body portion is configured to allow the rotated or moved operational member to return to the home position automatically. A shift range is changed to a neutral range when the operational member is rotated from the home position, and the shift range is changed to a traveling range (a drive range or a reverse range) when the operational member is moved in the vehicle longitudinal direction from the rotated position after the operational member is rotated from the home position. Herein, changing of the shift range to the drive range or the reverse range depends on the direction of the rotation of the dial from the home position.

11 Claims, 15 Drawing Sheets

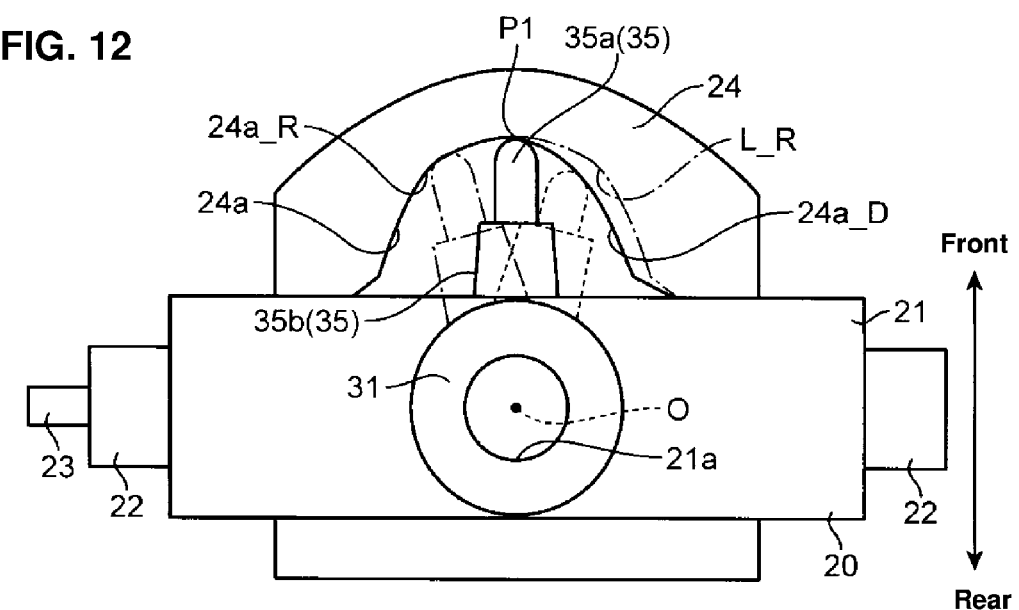

Front ← → Rear

SHIFT CONTROL DEVICE FOR VEHICLE

BACKGROUND OF THE INVENTION

The present invention relates to a shift control device for a vehicle for changing a shift range of the vehicle.

A so-called electric shifter device, in which a position of an operational member which corresponds to a shift lever is detected electrically for shifting, is known as a shift control device for a vehicle. This electric shifter device has been widely used in electric vehicles or hybrid vehicles which do not have a mechanical transmission. However, the electric shifter device which does not require a mechanical connection between the operational member and the transmission is superior in design flexibility, so that there is a tendency that vehicles provided with the mechanical transmission, such as conventional vehicles which install an engine (internal combustion engine) only as a power source, use the electric shifter device.

In the electric shifter device having less limitation in the operational amount and the operational direction of the operational member, a dial type of operational member in which a traveling range is changed according to rotation and the like of the operational member has been considered from viewpoints of the compactness and the operability. That is, the dial type of operational member can shorten its operational stroke and make its size compact properly, and also since it may be unnecessary for a driver to move a wrist greatly when operating the operational member and the driver may operate the operational member without seeing, the superior operability can be provided. A device disclosed in Japanese Patent Laid-Open Publication No. 2010-105621 is known as an example of the above-described electric shifter device.

In the device of this patent document, a rotatable operational knob is provided, and the shift range is changed to a neural range when this operational knob is slid along a specified axial line, and also the shift range is changed to a drive range or a reverse range when the operational knob is rotated further from its slid position after the operational knob is slid.

Further, in the electric shifter device, a so-called momentary type of mechanism, that is—a mechanism to return the operational member toward a specified home position automatically as soon as holding of the operational member by a driver's hand is released, has been widely used in order to improve the compactness or the operability. A device disclosed in Japanese Patent Laid-Open Publication No. 2010-105623 is known as an example of this momentary type of electric shifter device.

Specifically, in the device of this patent document, the operational member which can be slid and rotated is provided, and the shift range is changed to the neutral range when the operational member is slid from the home position. When holding of the operational member by a driver's hand is released in this state, the operational member is returned to the home position, keeping the neural range. Further, when the operational member is further rotated after it is slid from the home position, the shift range is changed to a traveling range (the drive range or the reverse range). When the holding of the operational member by the driver's hand is released in this state, the operational member is returned to the home position, keeping the changed shift range.

The device of this patent document is configured such that the shift range is changed to the neutral range when the operational member is slid from the home position. Therefore, there is a problem (i.e., an operation error) in that in a case in which the driver or another passenger touches the operational member inadvertently, the shift range may be improperly changed to the neutral range from the drive range or the reverse range.

SUMMARY OF THE INVENTION

The present invention has been devised in view of the above-described matter, and an object of the present invention is to provide a shift control device for a vehicle which can change the shift range relatively easily, restraining any operation error.

According to the present invention, there is provided a shift control device for a vehicle, comprising a shift device comprising an operational member provided in a vehicle compartment and a body portion supporting the operational member rotatably, clockwise or counterclockwise, from a specified home position and movably in a vehicle longitudinal direction, forward or rearward, from a rotated position after the operational member is rotated, the body portion being configured to allow the rotated or moved operational member to return to the home position automatically, a sensor to detect rotation and move of the operational member of the shift device, and a controller comprising a determination portion to determine a state of the rotation and the move of the operational member detected by the sensor and a range change portion to supply signals for changing a shift range of the vehicle among a neutral range, a drive range for forward traveling, and a reverse range for backward traveling to an automatic transmission based on determination results of the determination portion, wherein the range change portion of the controller is configured to supply a signal for changing the shift range to the neutral range to the automatic transmission when the determination portion determines that the operational member is rotated from the home position, supply a signal for changing the shift range to either one of the drive range and the reverse range to the automatic transmission when the determination portion determines that the operational member is moved in the vehicle longitudinal direction from the rotated position after the operational member is rotated clockwise from the home position, and supply a signal for changing the shift range to the other of the drive range and the reverse range to the automatic transmission when the determination portion determines that the operational member is moved in the vehicle longitudinal direction from the rotated position after the operational member is rotated counterclockwise from the home position.

According to the present invention, the shift range can be changed to the neutral range and the traveling range (the drive range or the reverse range) through an easy operation of rotating and moving (sliding) the operational member in the vehicle longitudinal direction, and also it can be surely restrained that the shift range is changed inadvertently, thereby ensuring the safety of the vehicle.

Specifically, the present invention is configured such that the shift range is changed to the neutral range by rotating the operational member from the home position and also the shift range is changed to the traveling range by further moving (sliding) the operational member in the vehicle longitudinal direction after the operational member is rotated from the home position, so that changing of the shift range (changing to the neutral range) is not attained unless the operational member is rotated from the home position, that is—unless an effective rotational torque is applied to the operational member. Accordingly, even if any unexpected force is applied to the operational member because of inadvertent touching of a hand with the operational member or something, changing of the shift range is attained only when the magnitude of the applied force and the application position of the force are equal to ones necessary to provide the operational member with the effective rotational torque. Thereby, any unexpected changing of the shift range can be restrained surely. That is, in a conventional device in which the shift range is changed by sliding the operational member, as long as a specified force for sliding the operational member is applied to any portion of the operational member, the operational member is slid and thereby the shift range is changed. By contrast, in the present invention, even when a specified force is applied to the operational member, any rotation of the operational member can be properly prevented in a case in which the application position of the force is too close to a rotational center of the operational member. Thus, the present invention is superior in surely restraining any unexpected changing of the shift range to the above-described conventional device. Moreover, even if the operational member is rotated inadvertently, the shift range is changed only to the neutral range and accordingly the shift range is not changed to the traveling range unless the operational member is further moved in the longitudinal direction after this inadvertent rotation, so that any unexpected forward or backward traveling of the vehicle can be restrained in the present invention.

According to an embodiment of the present invention, the operational member of the shift device is arranged on a left side of a driver seated in a driver's seat, the range change portion of the controller is configured to supply a signal for changing the shift range to the reverse range to the automatic transmission when the determination portion determines that the operational member is moved in the vehicle longitudinal direction from the rotated position after the operational member is rotated counterclockwise from the home position and supply a signal for changing the shift range to the drive range to the automatic transmission when the determination portion determines that the operational member is moved in the vehicle longitudinal direction from the rotated position after the operational member is rotated clockwise from the home position, and the body portion of the shift device is configured to support the operational member such that an operational force necessary for the operational member to be rotated clockwise from the home portion is smaller than an operational force necessary for the operational member to be rotated counterclockwise from the home position.

In the above-described embodiment, any inadvertent changing of the shift range to the reverse range or the drive change can be prevented more surely and also the easy operability of range changing can be maintained.

Specifically, the present embodiment is configured such that the operational forces necessary to rotate the operational member are different from each other in the rotational direction of the operational member (a reverse-range direction or a drive-range direction). Thereby, the driver can be surely made to recognize whether the operational direction is the reverse-range direction or the drive-range direction when rotating the operational member. Accordingly, it can be restrained that the driver changes the shift range erroneously. Further, since the operational force of the rotation in the reverse direction (counterclockwise direction) is set to be relatively large, it can be prevented more surely that the shift range is inadvertently changed to the reverse range and accordingly the vehicle travels backward, so that the safety of the vehicle can be ensured properly.

Moreover, the present embodiment is configured such that the operational member is arranged on the left side of the driver and also the operational force of the rotation in the clockwise direction, i.e., in the direction of rotating a driver's wrist toward a driver's body side where a rotatable angle of the wrist is so small that the operation is relatively difficult, is set to be relatively small, compared to the operational force of the rotation in an opposite direction (the counterclockwise direction). Thereby, the operability of the rotational operation in the clockwise direction can be ensured properly, so that the easy operability of changing to the drive range can be maintained.

According to a different embodiment from the above-described embodiment, the operational member of the shift device is arranged on a right side of a driver seated in a driver's seat, the range change portion of the controller is configured to supply a signal for changing the shift range to the reverse range to the automatic transmission when the determination portion determines that the operational member is moved in the vehicle longitudinal direction from the rotated position after the operational member is rotated counterclockwise from the home position and supply a signal for changing the shift range to the drive range to the automatic transmission when the determination portion determines that the operational member is moved in the vehicle longitudinal direction from the rotated position after the operational member is rotated clockwise from the home position, and the body portion of the shift device is configured to support the operational member such that an operational force necessary for the operational member to be rotated counterclockwise from the home portion is an operational force necessary for the operational member to be rotated clockwise from the home position or smaller.

This different embodiment is configured such that the operational member is arranged on the right side of the driver and also the shift range is changed to the reverse range by rotating the operational member in the counterclockwise direction that is the direction of rotating the driver's wrist toward the driver's body side, i.e., in the counterclockwise direction where the rotatable angle of the wrist is so small that the operation is relatively difficult. Thereby, it can be restrained that the shift range is unexpectedly changed to the reverse range which may require paying attention to its changing particularly, so that the safety of the vehicle can be improved.

Herein, if the operational force necessary to rotate the operational member counterclockwise is set to be large, the rotatable angle of the wrist is small and also the operational force becomes large, so that the rotational operation of the operational member in the counterclockwise direction may deteriorate considerably. By contrast, since the above-described different embodiment is configured such that the operational force necessary to rotate the operational member counterclockwise is the operational force necessary to rotate the operational member clockwise or smaller, the safety of the vehicle can be improved as described above and it can be prevented properly that the operability of the operational member's counterclockwise rotation deteriorates considerably.

According to another embodiment of the present invention, the shift control device further comprises a rotational-side biasing means to bias the operational member of the shift device which is rotated from the home position in a direction of returning the operational member toward the home position, wherein the rotational-side biasing means is configured such that a biasing force thereof in a case in which the operational member is rotated clockwise from the home position is different from a biasing force thereof in a case in which the operational member is rotated counterclockwise from the home position.

In the present embodiment, the operational force necessary to rotate the operational member can be differentiated according to its rotational direction by utilizing the rotational-side biasing means to bias the operational member to the home position, so that the device itself can be relatively simple, compared to a case in which another component to change the operational force is provided additionally.

According to another embodiment of the present invention, the body portion of the shift device is configured to support the operational member such that an operational force necessary for the operational member of the shift device to be moved in the vehicle longitudinal direction in order to change the shift range to the reverse range is larger than an operational force necessary for the operational member to be moved in the vehicle longitudinal direction in order to change the shift range to the drive range.

In the present embodiment, it can be prevented more surely that the shift range is changed to the reverse range which may require paying attention to its changing particularly, so that the safety of the vehicle can be improved more.

Herein, it is preferable that the range change portion of the controller be configured to supply a signal for changing the shift range to the reverse range to the automatic transmission when the determination portion determines that the operational member of the shift device is moved forward from the rotated position after the operational member is rotated from the home position and supply a signal for changing the shift range to the drive range to the automatic transmission when the determination portion determines that the operational member is moved rearward from the rotated position after the operational member is rotated.

In this case, since the shift direction of the operational member for changing the shift range to the reverse range which may require a larger operational force is set to be the forward direction which may be easier for the driver to apply an operational force, the operability can be maintained, preventing any inadvertent changing of the shift range to the reverse range. Further, since the shift direction of the operational member for changing the shift range to the reverse range and the shift direction of the operational member for changing the shift range to the drive range are configured to be different from each other in the vehicle longitudinal direction, it can be prevented more surely that the shift range is changed erroneously.

Herein, it is preferable that the shift control device further comprise a move-side biasing means to bias the operational member of the shift device which is moved in the vehicle longitudinal direction from the rotated position after the operational member is rotated from the home position in a direction of returning the operational member toward the rotated position, wherein the move-side biasing means is configured such that a biasing force thereof in a case in which the operational member is moved forward from the rotated position is different from a biasing force thereof in a case in which the operational member is moved rearward from the rotated position.

In this case, since the operational force necessary to move the operational member in the vehicle longitudinal direction can be differentiated according to its move direction by utilizing the move-side biasing means to bias the operational member to the rotated position, so that the device itself can be relatively simple, compared to a case in which another component to change the operational force is provided additionally.

Other features, aspects, and advantages of the present invention will become apparent from the following description which refers to the accompanying drawings.

BRIEF DESCRIPTION OF THE DRAWINGS

FIG. 9A showing a state of the shift device located at a home position; FIG. 9B showing a state of the shift device rotated counterclockwise from the home position; and FIG. 9C showing a state of the shift device slid forward after a rotation.

FIG. 10A showing a state in which a dial of the shift device is located at the home position; FIG. 10B showing a state in which the dial is rotated counterclockwise from the home position; and FIG. 10C showing a state in which the dial is slid forward after the rotation.

FIG. 11A showing the state in which the dial of the shift device is located at the home position; FIG. 11B showing the state in which the dial is rotated counterclockwise from the home position; and FIG. 11C showing the state in which the dial is slid forward after the rotation.

FIG. 12 is an enlarged plan showing a slide block and its surrounding portion.

FIG. 13A showing the state in which the dial of the shift device is located at the home position; FIG. 13B showing the state in which the dial is rotated counterclockwise from the home position; and FIG. 13C showing the state in which the dial is slid forward after the rotation.

FIG. 16A showing a state in which the hand holds the dial located at the home position; and FIG. 16B showing a state in which the hand rotates the dial from the home position.

DETAILED DESCRIPTION OF THE INVENTION

Hereinafter, preferred embodiments of the present invention will be described specifically referring to the accompanying drawings.

Embodiment 1

[Entire Structure]

Figure 1:
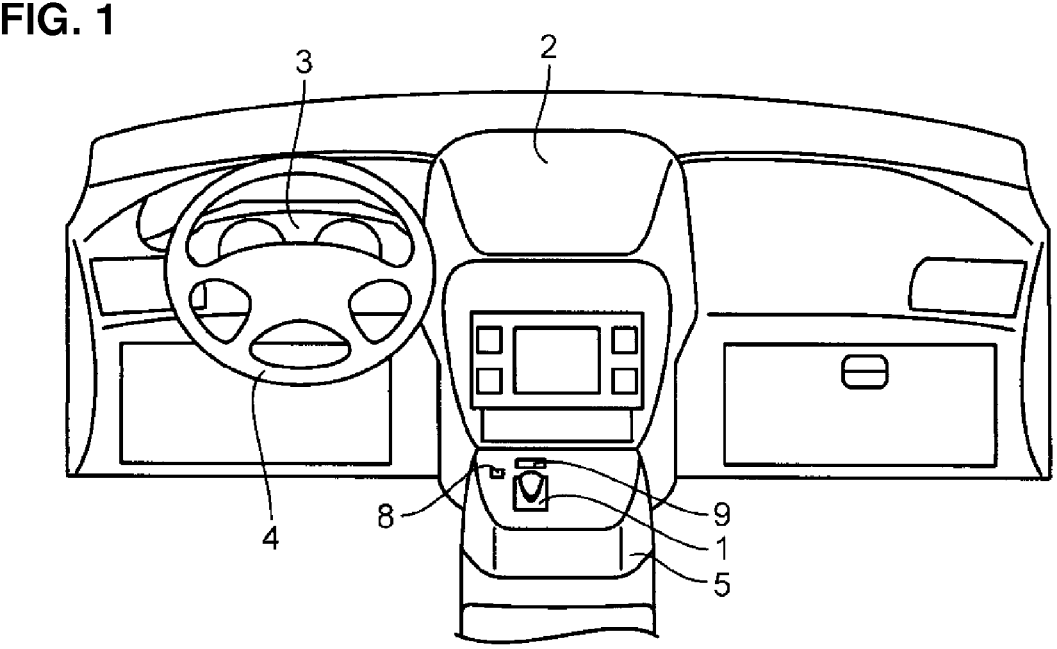
FIG. 1 is a diagram showing a structure of a vehicle-compartment front portion of a vehicle which is equipped with a shift device of a shift control device according to a first embodiment of the present invention.

FIG. 1 is a diagram showing a structure of a vehicle-compartment front portion of a vehicle which is equipped with a shift device of a shift control device according to a first embodiment of the present invention. As shown in FIG. 1, a vehicle according to a first embodiment is a so-called left-handle vehicle in which a driver's seat and a steering wheel 4 are provided on a left side of the vehicle. An instrument panel 2 which extends in a vehicle width direction is provided at a vehicle-compartment front portion as shown in the figure. A meter unit 3 is provided on a driver's-seat side of the instrument panel 2, and behind the meter unit 3 is provided the steering wheel 4. A center console 5 is provided at a portion which extends rearward from a central portion, in the vehicle width direction, of the instrument panel 2, and on the center console 5 are provided a shift device 1, a parking switch 8, and an indicator 9 which constitute part of the shift control device for the vehicle according to the first embodiment.

In the first embodiment, the vehicle comprises an engine (not illustrated) which is comprised of an internal combustion engine, such as a gasoline engine or a diesel engine, and an automatic transmission 90 (FIG. 15) which transmits a drive force of the engine to wheels with speed reduction. The automatic transmission 90 is a multi-stage transmission (AT) which includes a planetary gear mechanism and automatically selects an appropriate one among plural speed-reduction ratios which are attained by the planetary gear mechanism according to a vehicle speed, an engine load, and the like. A shift range of the automatic transmission 90 includes a parking range in which a drive-force transmission is shut off, a forward-traveling range, i.e., a drive range, in which the drive force is transmitted so as to make the vehicle travel forward, and a backward-traveling range, i.e., a reverse range, in which the drive force is transmitted so as to make the vehicle travel backward.

The parking switch 8 is a switch to be operated when the shift range of the automatic transmission 90 is changed to the parking range. In an example shown in FIG. 1, the parking switch 8 is a push-type of button switch in which selection/non-selection of the parking range is switched each time the parking switch 8 is pushed. A letter plate with "P" which means the parking range is provided on an upper face of the parking switch 8, and when the parking range is selected, the letter "P" is indicted noticeably by a light source, such as LED.

The shift device 1 is a device to be operated when the shift range of the automatic transmission 90 is changed to any other range than the parking range (i.e., the drive range, the reverse range, or the neutral range). The shift device 1 is configured to be rotated or slid (moved) in the vehicle longitudinal direction from its rotated position, which will be described specifically later. The shift range of the automatic transmission 90 is changed to either one of the drive range, the reverse range, and the neutral range according to operational patterns applied to the shift device 1.

Figure 2:
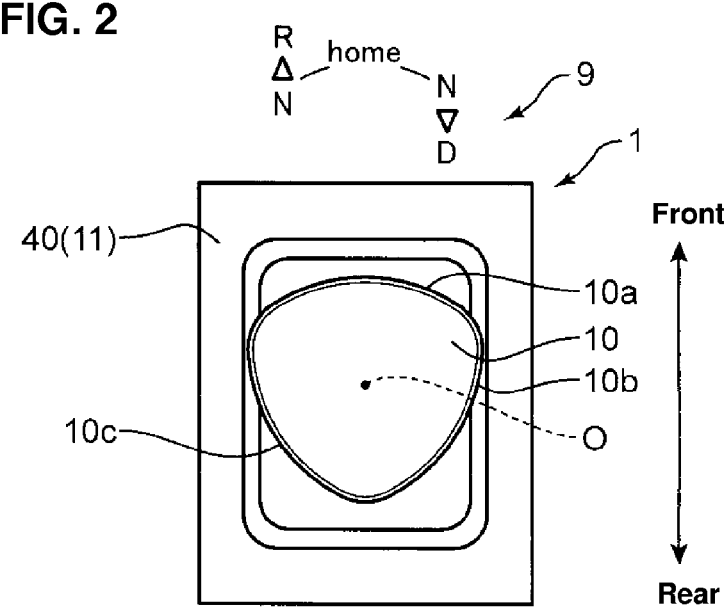
FIG. 2 is a plan view of the shift device and its surrounding portion.

The indicator 9 indicates the shift range selected currently among the drive range, the reverse range and the neutral range. FIG. 2 is an enlarged plan view showing the shift device 1 and its surrounding portion. In the case of the indicator 9 exemplified in FIG. 2, there is provided a letter plate with "R" which means the reverse range, "N" which means the neutral range, and "D" which means the drive range. When any of the drive range, the reverse range, and the neutral range is selected through the operation of the shift device 1, the letter corresponding to this selected range (any of "R", "N" and "D") is indicated noticeably. Herein, the letter of "home" shown in FIG. 2 means that a home position of a dial 10 is located at this position.

In addition to the indication of the shift range by means of the indicator 9, the shift range is indicated at the meter unit 3 in the example shown in FIG. 1. That is, the meter unit 3 includes, at a specified position (between a vehicle-speed meter and an engine-speed meter, for example), an indication portion which is comprised of a liquid-crystal screen or the like, and the letter ("P", "R", "N", "D") corresponding to the selected shift range is indicated on this indication portion.

A specific structure of the shift device 1 will be described.

Figure 3:
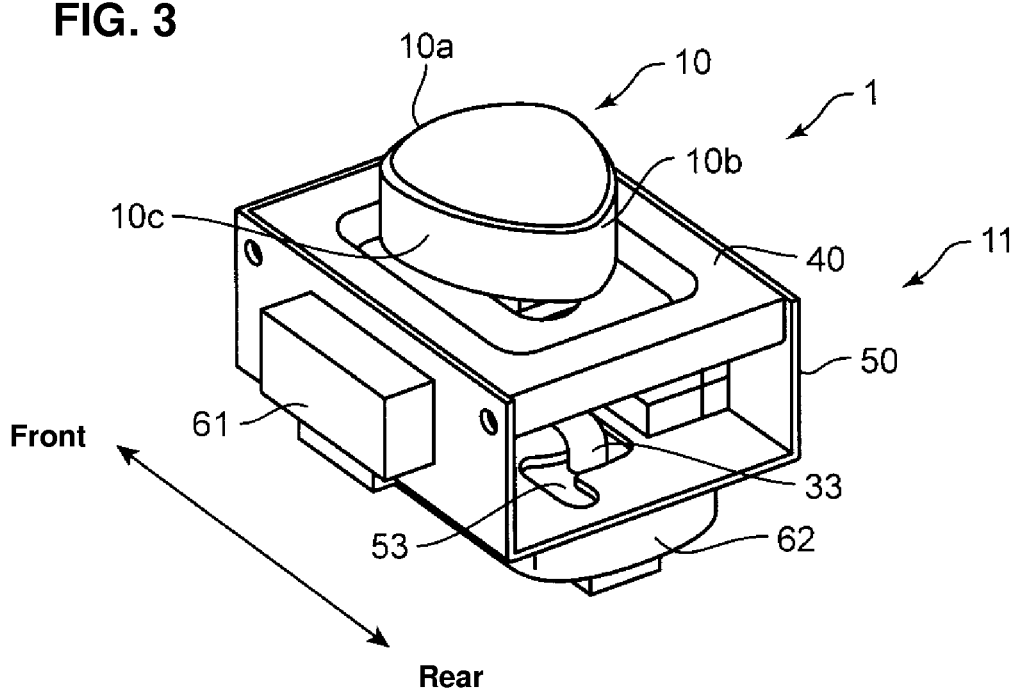
FIG. 3 is a perspective view of the shift device.
Figure 4:
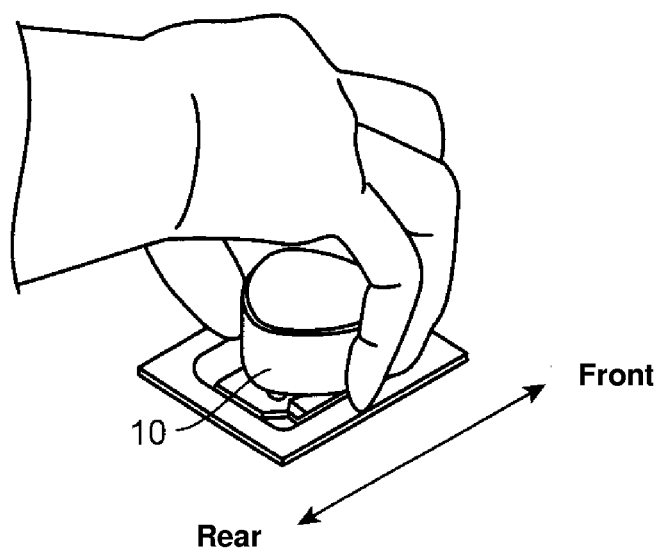
FIG. 4 is a diagram showing an operational example of the shift device.
Figure 5:
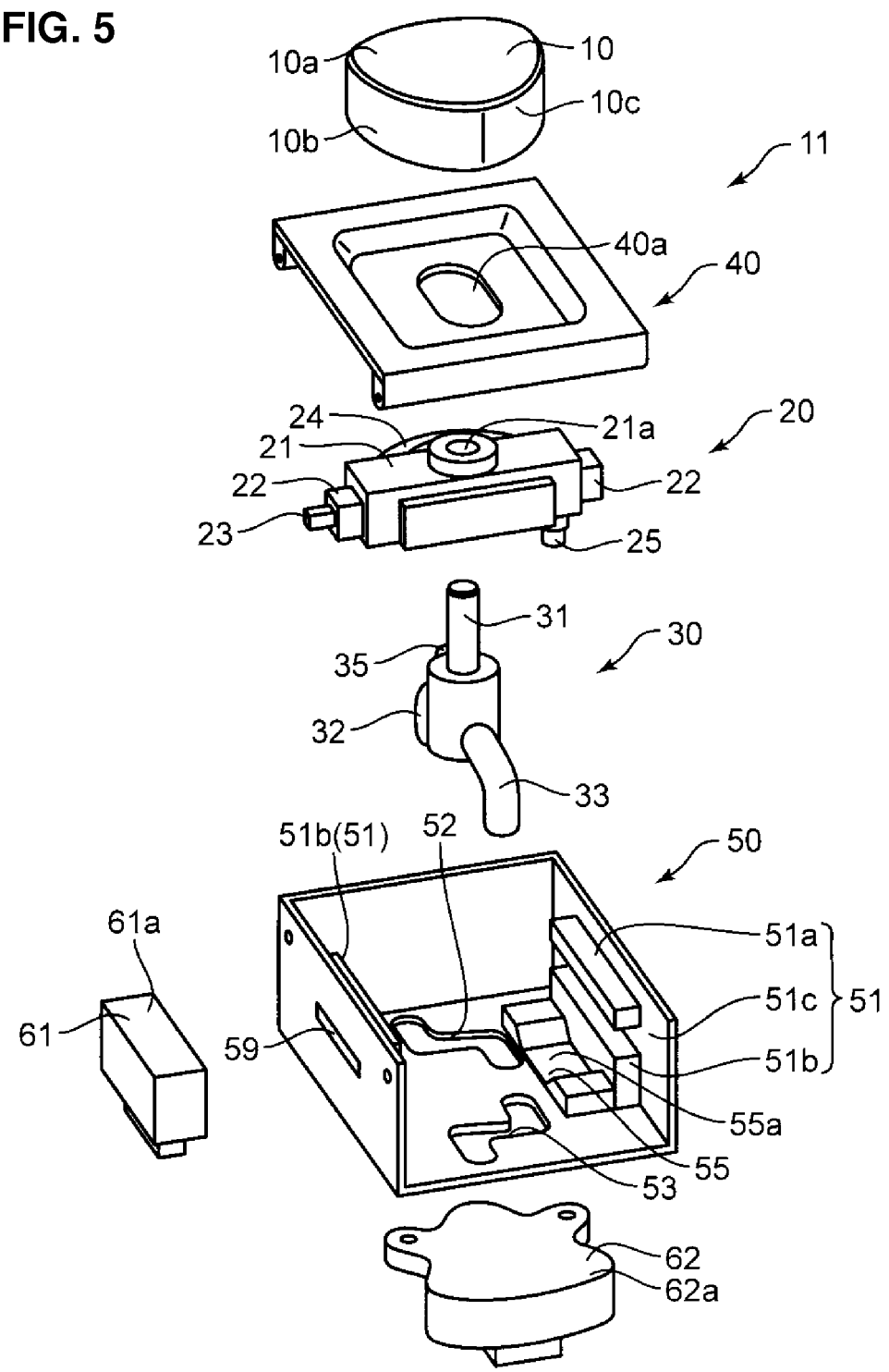
FIG. 5 is an exploded perspective view of the shift device.
Figure 6:
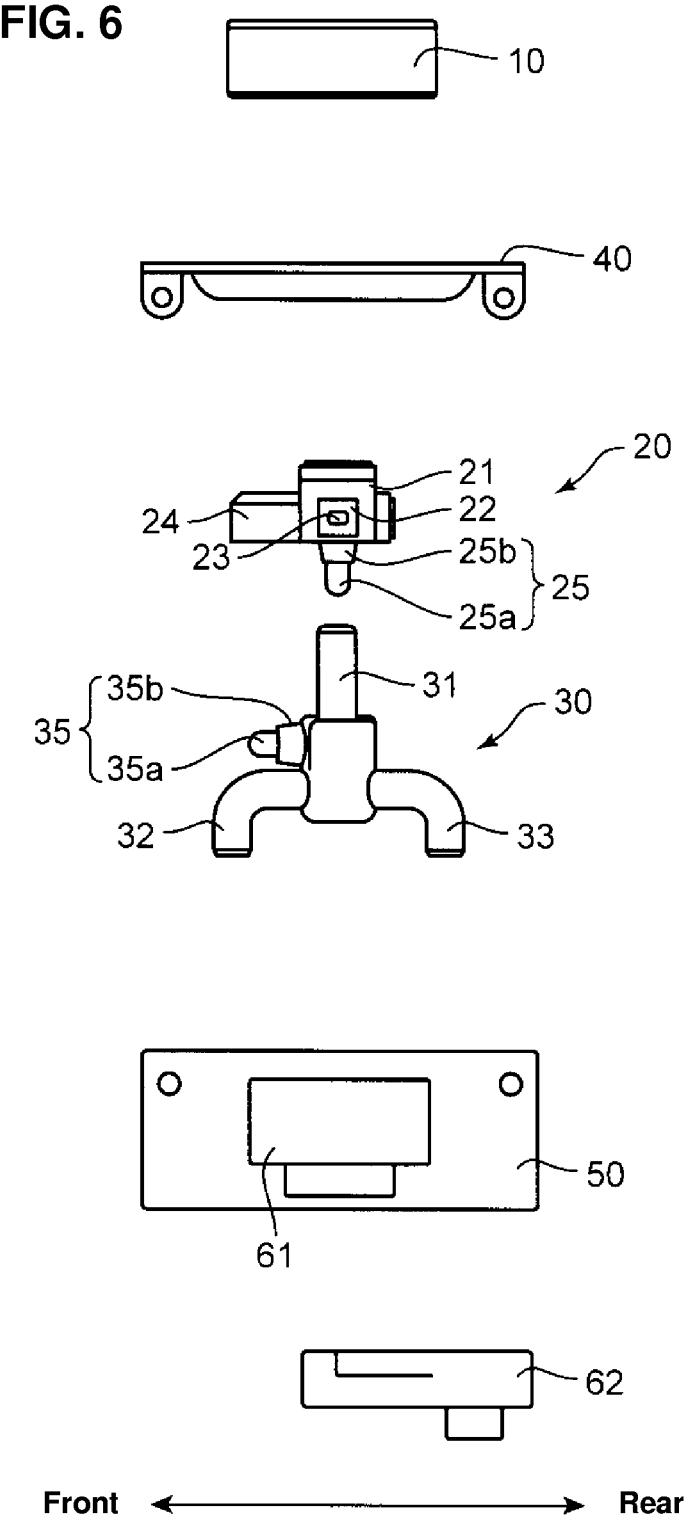
FIG. 6 is an exploded side view of the shift device.
Figure 7:
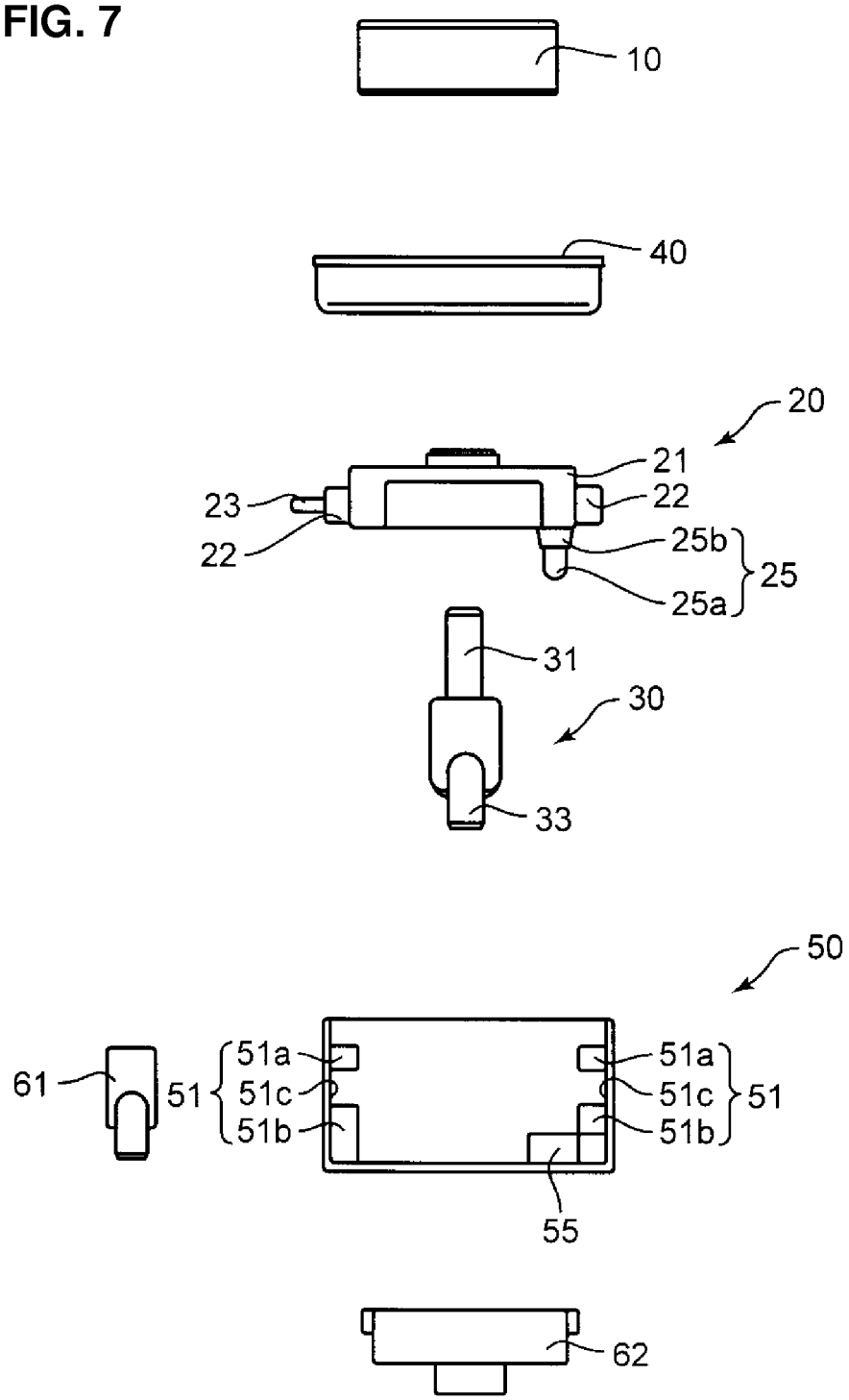
FIG. 7 is an exploded back view of the shift device.

FIG. 3 is a perspective view of the shift device 1. FIG. 4 is a diagram showing an operational example of the shift device 1. FIGS. 5-7 are exploded views of the shift device 1.

As shown in these figures and FIG. 2, the shift device 1 comprises the dial (operational member) 10 and a body portion 11 which supports the dial 10 rotatably and sliding-movably in the vehicle longitudinal direction from a rotated position after the dial 10 is rotated. Hereafter, the vehicle longitudinal direction will be referred to as a "longitudinal direction" simply, a front side/forward in this direction will be referred to as a "front side/forward" simply, and a rear side/rearward in this direction will be described to as a "rear side/rearward" simply. Further, in the figures, "Front" means the front side in the vehicle longitudinal direction, and "Rear" means the rear side in the vehicle longitudinal direction.

The dial 10 is a portion to be held by a driver (passenger). The dial 10 is supported, having its position shown in FIG. 2 being its home position, rotatably—clockwise (in a right direction) or counterclockwise (in a left direction)—from the home position and sliding-movably in the longitudinal direction from a rotated position after the dial 10 is rotated. In the present embodiment, the dial 10 is supported so that it can be slid rearward from its rotated position only in a case in which the dial 10 is rotated clockwise from the home position, whereas it can be slid forward from its rotated position only in a case in which the dial 10 is rotated counterclockwise from the home position. Further, the dial 10 is supported such that it is rotated around its rotational center O.

As shown in FIG. 2, the dial 10 of the present embodiment is configured to be symmetrical relative to a line extending in the longitudinal direction in a state in which the dial 10 is located at the home position. Also, the dial 10 is configured substantially in a regular-triangular shape such that a rear end portion located on its center line is an apex of the triangle. Each side of the regular-triangular shaped dial 10 is configured to protrude outward in a curve shape. That is, the dial 10 includes a front end face 10a which protrudes forward and side faces 10b, 10c which respectively protrude outward and rearward toward its rear end from both ends of the front end face 10a. The driver can hold the dial 10 in a state in which a thumb and a little finger of the driver contact the both side faces 10b, 10c, respectively, as shown in FIG. 4.

As shown in FIGS. 5-7, the body portion 11 comprises a boxy housing 50 which opens upward and a cover portion 40 which is attached to an upper face of the housing 50 so as to cover over its opening portion. The dial 10 is arranged above the cover portion 40. The body portion 11 further comprises a rod 30 which extends downward from the dial 10, penetrating the cover portion 40, and is stored inside the housing 50, and a slide block 20 which is stored in the housing 50.

The rod 30 includes a shaft portion 31 which extends downward from the dial 10, passing through a hole 40a which is formed at the cover portion 40, a leg portion for rotational-side detent 35, and a pair of leg portions for guide 32, 33.

The shat portion 31 of the rod 30 is fixed to a lower face of the dial 10 rotatably and slide-movably together with the lower face of the dial 10, so that the rod 30 can rotate and slide in the longitudinal direction together with the dial 10. In the present embodiment, the shaft portion 31 is fixed to the dial 10 such that a center axis thereof and the center (the rotational center O) of the dial 10 match each other in a plan view, so that the rod 30 rotates around the central axis of the shaft portion 31 together with the dial 10. Herein, the inner diameter of the above-described through hole 40a formed at the cover portion 40 is set to be larger than the outer diameter of the shaft portion 31 of the rod 30 by a specified length so that the rod 30 can rotate and slide in the longitudinal direction. Hereafter, the rotational center of the rod 30 and the dial 10 will be referred to as the "rotational center O" simply in some cases.

The leg portion for rotational-side detent 35 is a bar member which projects horizontally from a middle position, in a vertical direction, of the shaft portion 31. In the present embodiment, the leg portion for rotational-side detent 35 is provided to project straightly forward from the shaft portion 31 in a state in which the dial 10 is located at the home position. The leg portion for rotational-side detent 35 comprises, as shown in FIG. 6 and others, a hollow-shaped leg body portion 35b which extends forward from an outer peripheral face of the shaft portion 31 and a biasing portion 35a which further projects forward from a tip of the leg body portion 35b. The biasing portion 35a is pressed forward by a compressive spring (a rotational-side biasing member) provided inside the leg body portion 35b. The biasing portion 35a is supported movably in the longitudinal direction relative to the leg body portion 35b such that it moves rearward when receiving a rearward force pushing back the compressive spring but it moves forward when the rearward force decreases.

Each of the leg portions for guide 32, 33 is a bar-shaped member, and these portions 32, 33 project horizontally from respective positions of the outer peripheral face of the shaft portion 31 which face each other, and then extend downward, respectively. In the present embodiment, the leg portions for guide 32, 33 are configured such that in the state in which the dial 10 is located at the home position, the leg portion 32 projects straightly forward from the outer peripheral face of the shaft portion 31 and then extends downward and the leg portion 33 projects straightly rearward from the outer peripheral face of the shaft portion 31 and then extends downward.

The slide block 20 comprises a block-shaped body portion 21, a pair of projection pieces for guide 22, 22 which project outward from a side face of the body portion 21, respectively, a slide-side detection body 23 which further projects outward from one of the projection pieces for guide 22, a leg portion for slide-side detent 25 which projects downward from a lower face of the body portion 21, and a rotational-side guide member 24 which is provided forward of the body portion 21.

The body portion 21 of the slide block 20 has a vertically-penetrating through hole 21a through which the shaft portion 31 of the rod 30 extends. The inner diameter of the through hole 21a is set to be substantially equal to the outer diameter of the shaft portion 31 of the rod 30 such that the shaft portion 31 is rotatable inside the through hole 21a. Therefore, when the rod 30 rotates together with the dial 10, the shaft portion 31 of the rod 30 rotates inside the through hole 21a but the slide block 20 does not rotate. When the rod 30 slides in the longitudinal direction together with the dial 10, the slide block 20 also slides together with the rod 30 and the dial 10. In other words, the rod 30 and the dial 10 are supported at the slide block 20 rotatably around the central axis of the shaft portion 31 of the rod 30 and the center of the dial 10.

In the present embodiment, the body portion 21 of the slide block 20 is substantially of a rectangular-parallelepiped shape which is configured to extend in the vehicle width direction. The projection pieces for guide 22, 22 project outward in the vehicle width direction from both side faces, in the vehicle width direction, of the body portion 21 of the slide block 20, respectively.

The leg portion for slide-side detent 25 has a similar structure to the leg portion for rotational-side detent 35 as shown in FIG. 6 and others. That is, the leg portion for slide-side detent 25 comprises a hollow-shaped leg body portion 25b which extends downward from the lower face of the body portion 21 of the slide block 20 and a biasing portion 25a which further projects downward from a tip of the leg body portion 25b. The biasing portion 25a is pressed downward by a compressive spring (a move-side biasing member, not illustrated) provided inside the leg body portion 25b. The biasing portion 25a moves upward relative to the leg body portion 25b when receiving an upward force pushing back the compressive spring, but it moves downward when the upward force decreases.

FIG. 12 is an enlarged plan view showing the slide block 20 and its surrounding portion. As show in FIG. 12, the rotational-side guide member 24 projects forward in an arch shape from a front face of the body portion 21 of the slide block 20, and a specified space is formed between the rotational-side guide member 24 and the body portion 21. The rotational-side guide member 24 has a rotational-side guide face 24a which is concaved forward, facing a front face of the body portion 21. The leg portion for rotational-side detent 35 of the rod 30 is arranged in the space formed between the rotational-side guide member 24 and the body portion 21. In this arrangement state, a tip (front end) of the biasing portion 35a of the leg portion for rotational-side detent 35 is pressed against the rotational-side guide face 24a all the time, receiving a pressing force of the compressive spring. The rotational-side guide face 24a and the leg portion for rotational-side detent 35 constitute a rotational-side momentary mechanism ("rotational-side biasing means") which is configured to return the dial 10 to the home position automatically when the dial 10 is rotated from the home position. Details of the momentary mechanism and the rotational-side guide face 24a will be described later.

As shown in FIG. 7 and others, a pair of slide-block support portions 51, 51 which support the projection pieces for guide 22, 22 of the slide block 20 sliding-movably in the longitudinal direction, respectively, are formed at both side faces, in the vehicle width direction, of the housing 50. Specifically, each of the slide-block support portions 51, 51 includes guide wall portions 51a, 51b which project inward from a side face of the housing 50 and extend in the longitudinal direction, respectively. These guide wall portions 51a, 51b are spaced apart from each other, and a guide groove 51c which extends in the longitudinal direction is formed between the guide wall portions 51a, 51b. The projection pieces for guide 22, 22 of the slide block 20 are inserted into this guide groove 51c, so that the projection pieces for guide 22, 22 and also the slide block 20 are supported sliding-movably in the longitudinal direction along the guide groove 51c.

As shown in FIG. 5 and others, a through hole 59 is formed at a bottom face of one of the guide grooves 51c, i.e., at a side face of the housing 50. The slide-side detection body 23 of the slide block 20 is inserted into the through hole 59 such that it projects outward from an outer face of the housing 50. This through hole 59 is of a slot shape which extends in the longitudinal direction so that the slide-side detection body 23 is sliding-movable in the longitudinal direction.

At a bottom face of the hosing 50 are formed rod guide grooves 52, 53 into which the leg portions for guide 32, 33 of the rod 30 are inserted, respectively. The rod 30 is arranged inside the housing 50 such that a lower end portion of the shaft portion 31 contacts the bottom face of the housing 50 in a state in which the leg portions for guide 32, 33 are inserted into the rod guide grooves 52, 53.

Figure 8:
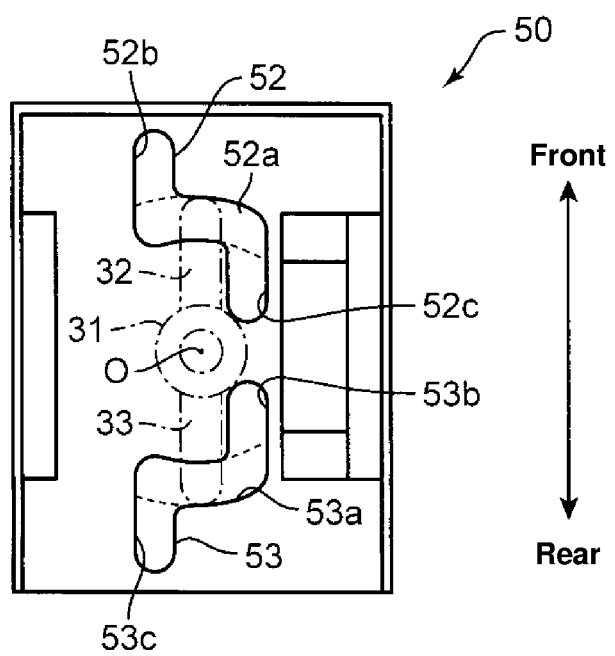
FIG. 8 is a plan view of a housing.

FIG. 8 is a plan view of the housing 50. As shown in this FIG. 8, the rod guide grooves 52, 53 include arc-shaped rotational-side grooves 52*a*, 53*a* which extend along a periphery of a circle with the rotational center O in the plan view, and R-range-side grooves 52*b*, 53*b* and D-range-side grooves 52*c*, 53*c* which are continuous from the rotational-side grooves 52*a*, 53*a* and extend longitudinally from both ends of the rotational-side groove 52*a*, 53*a*, respectively.

Specifically, the rotational-side grooves 52*a*, 53*a* extend from specified positions located on a line extending in the longitudinal direction, passing the rotational center O, clockwise and counterclockwise by the same angle (15°, for example), respectively.

The rod guide groove 52 formed on the front side includes the R-range-side groove 52*b* which extends forward from an end portion (left-side end portion) of the counterclockwise direction of the rotational-side groove 52*a* and the D-range-side groove 52*c* which extends rearward from an end portion (right-side end portion) of the clockwise direction of the rotational-side groove 52*a*. Meanwhile, the rod guide groove 53 formed on the rear side includes the R-range-side groove 53*b* which extends forward from an end portion (right-side end portion) of the counterclockwise direction of the rotational-side groove 53*a* and the D-range-side groove 53*c* which extends rearward from an end portion (left-side end portion) of the clockwise direction of the rotational-side groove 53*a*.

Since the rod guide grooves 52, 53 are configured as described above, when the dial 10 and the rod 30 are rotated clockwise from a state in which the dial 10 is located at the home position and the leg portions for guide 32, 33 respectively project straightly forward and rearward from the shaft portion 31, the dial 10 and the rod 30 move forward only from their rotated positions. Meanwhile, when the dial 10 and the rod 30 are rotated counterclockwise from the above-described state, the dial 10 and the rod 30 move rearward only from their rotated positions.

Figure 9A:
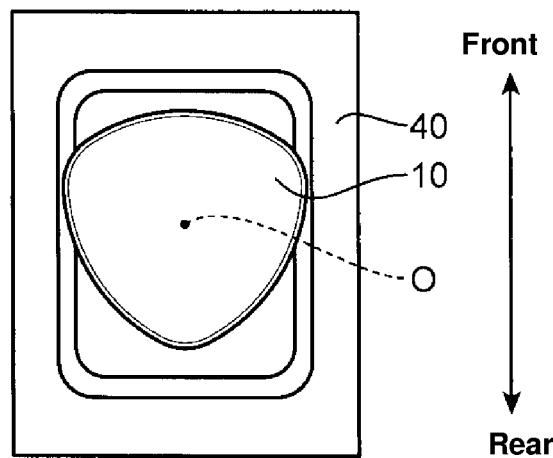
FIGS. 9A, 9B and 9C are plan views of the shift device in different states.
Figure 9B:
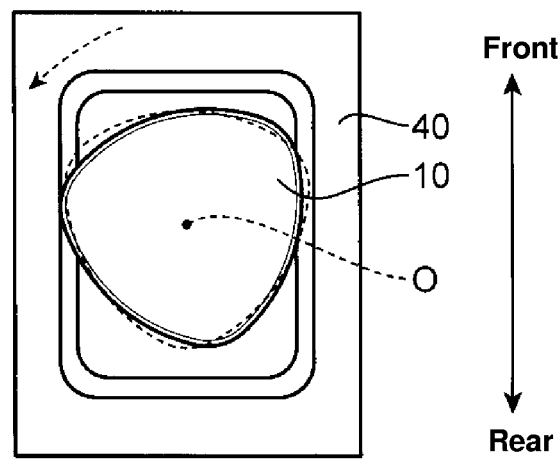
Figure 9C:
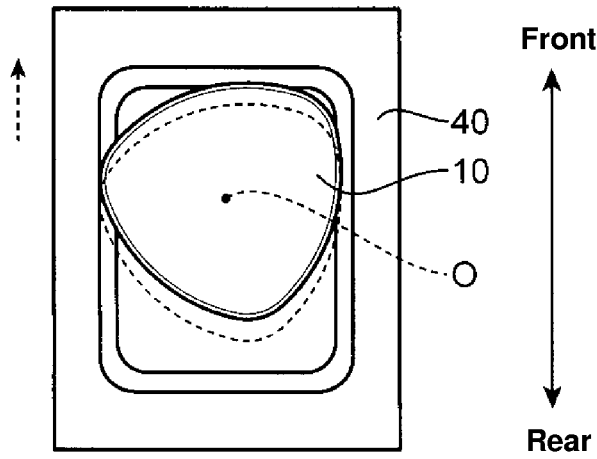
Figure 10A:
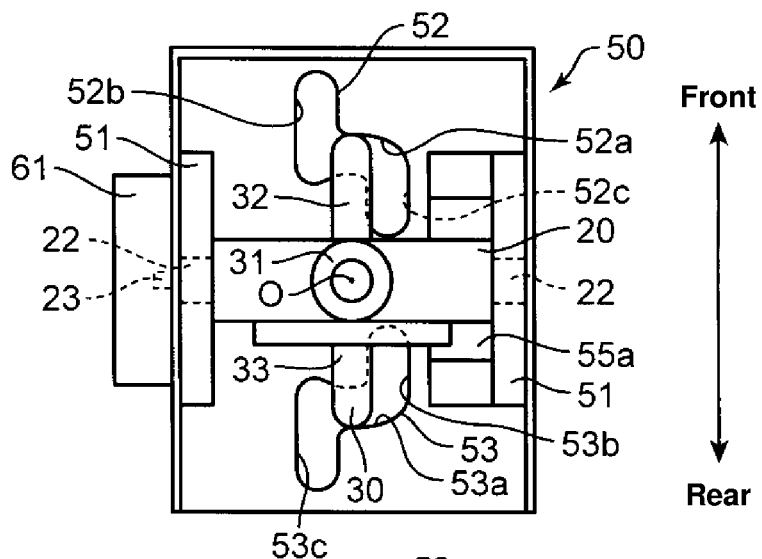
FIGS. 10A, 10B and 10C are plan views showing an inside of a body portion of the shift device in different states.
Figure 10B:
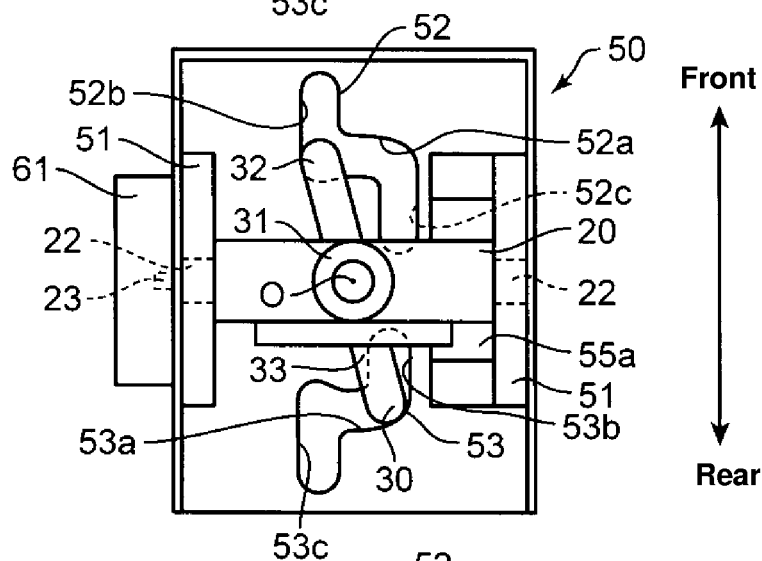
Figure 10C:
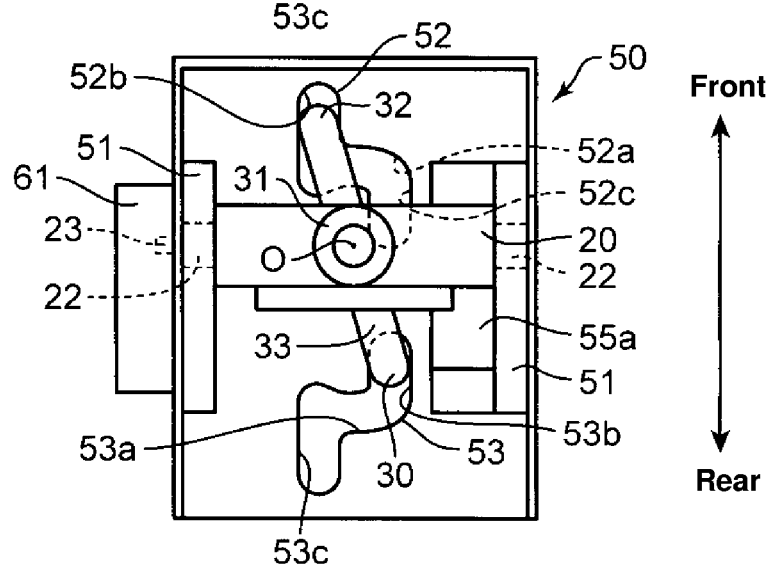

Rotational and slide-moving states of the dial 10, the rod 30 and the slide block 20 are shown in FIGS. 9A-9C and 10A-10C. FIGS. 9A-9C show the rotational and slide-moving states of the dial 10. FIGS. 10A-10C shows the states of the rod 30 and the slide block 20, which correspond to FIGS. 9A-9C. FIGS. 9A and 10A show the states in which the dial 10 is located at the home position. As described above, the rod 30 is configured such that the leg portions for guide 32, 33 project straightly forward and rearward from the shaft portion 31 in the state in which the dial 10 is located at the home position.

When the dial 10 is rotated counterclockwise from this state as shown in FIG. 9B, the leg portions for guide 32, 33 move counterclockwise along the rotational-side grooves 52*a*, 53*a* of the rod guide grooves 52, 53 as shown in FIG. 10B. If the leg portions for guide 32, 33 contact the end portions of the rotational-side grooves 52*a*, 53*a*, the rod 30 and the dial 10 are unable to be rotated further.

When the dial 10 is moved (slid) forward from this state as shown in FIG. 9C, the leg portions for guide 32, 33 move forward along the R-range-side grooves 52*b*, 53*b* of the rod guide grooves 52, 53 as shown in FIG. 10C. Further, the slide block 20 moves forward together with the rod 30. Herein, the projection portions 22, 22 of the slide block 20 move along the guide groove 51*c* formed at the housing 50. If the leg portions for guide 32, 33 contact the front ends of the R-range-side grooves 52*b*, 53*b*, the rod 30 and the dial 10 are unable to be moved further.

Meanwhile, when the dial 10 is rotated clockwise from the state in which the dial 10 is located at the home position, not illustrated, the leg portions for guide 32, 33 move clockwise along the rotational-side grooves 52*a*, 53*a* of the rod guide grooves 52, 53. Then, if the dial 10 is further slid (moved) rearward in the state in which the leg portions for guide 32, 33 contact the end portions of the rotational-side grooves 52*a*, 53*a*, the leg portions for guide 32, 33 move rearward along the D-range-side grooves 52*c*, 53*c* of the rod guide grooves 52, 53 and the slide block 20 moves rearward together with the rod 30.

Returning to FIG. 5, a slide-side guide member 55 is provided at a position of the housing 50 which faces the leg portion for slide-side detent 25 of the slide block 20. At an upper face of the slide-side guide member 55 is formed a slide-side guide face 55*a* which is concaved downward and substantially hemisphere-shaped in a side view. A tip portion of the leg portion for slide-side detent 25, i.e., a tip of the biasing portion 25*a* is pressed against the slide-side guide face 55*a* all the time. The slide-side guide face 55*a* and the leg portion for slide-side detent 25 constitute a slide-side momentary mechanism ("move-side biasing means") which is configured to return the dial 10 and the rod 30 to the home positions automatically when the dial 10 and the rod 30 are moved in the longitudinal direction from the home positions. Details of the momentary mechanism and the slide-side guide face 55*a* will be described later.

As shown in FIGS. 3, 5 and others, a move-amount sensor 61 to detect the amount of move, in the longitudinal direction, of the dial 10 is provided at a side face of the housing 50 which has the through hole 59. Specifically, the move-amount sensor 61 detects the amount of move, in the longitudinal direction, of the slide-side detection body 23 which is provided at the slide block 20 moving together with the dial 10 as a longitudinal move amount of dial 10. The slide-side detection body 23 is stored in a housing 61*a* of the move-amount sensor 61, and the position of the slide-side detection body 23 is detected by a sensor portion (not illustrated) provided in the housing 61*a*.

Further, at a lower face of the housing 50 is provided a rotational-amount sensor 62 to detect the amount of rotation of the dial 10. Specifically, the rotational-amount sensor 62 detects the amount of rotation of the leg portion for guide 33 of the rod 30 which rotates together with the dial 10 as a rotational amount of the dial 10. A tip of the leg portion for guide 33 is inserted into a housing 62*a* of the rotational-amount sensor 62, and the amount of rotation of the leg portion for guide 33 is detected by a sensor portion (not illustrated) provided in the housing 62*a*.

[Detailed Constitution of Momentary Mechanism]

First, the rotational-side momentary mechanism and the rotational-side guide face 24*a* will be described.

Figure 11A:
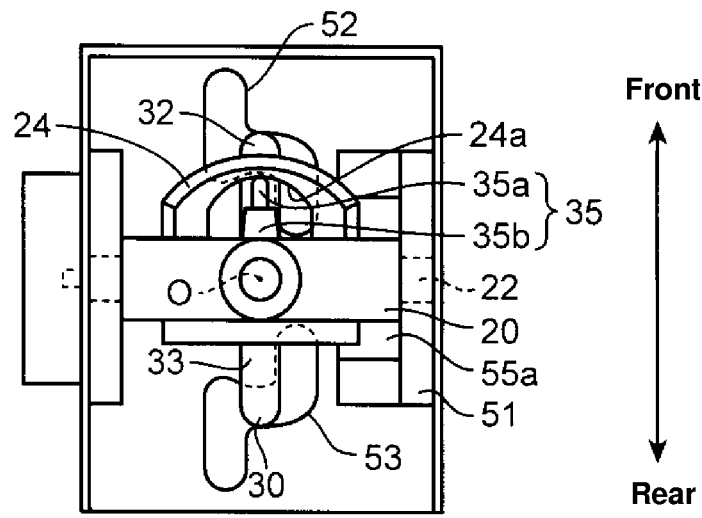
FIGS. 11A, 11B and 11C are plan views showing the inside of the body portion of the shift device in the different states.
Figure 11B:
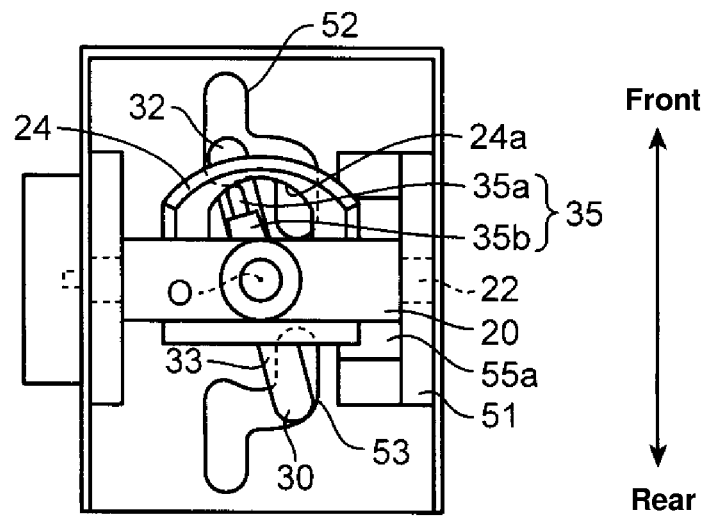
Figure 11C:
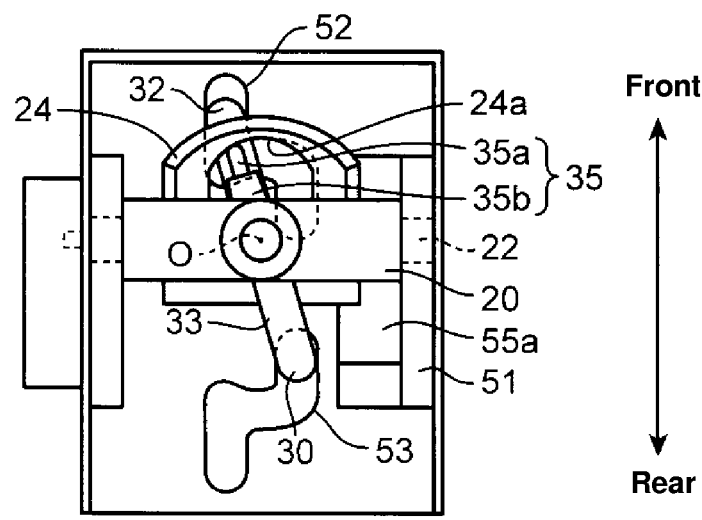

FIGS. 11A-11C correspond to FIGS. 9A-9C and FIGS. 10A-10C and show the states of the leg portion for rotational-side detent 35 when the dial 10 is rotated and slid. As shown in FIGS. 11A and 11B and described above, the slide block 20 is not moved when the dial 10 is rotated. Accordingly, the leg portion for rotational-side detent 35 rotates around the rotational center O along the rotational-side guide face 24*a*.

The rotational-side guide face 24*a* is configured to curve such that its front end P1 is located on the line which extends straightly forward, passing the rotational center O as shown in FIG. 12. The rotational-side guide face 24a has a D-range-side curve face 24a_D which is positioned on the clockwise side (right side) from the front end P1 and a R-range-side curve face 24a_R which is positioned on the counterclockwise side (left side) from the front end P1. As shown in FIG. 11A and described above, the leg portion for rotational-side detent 35 is configured to project straightly forward from the shaft portion 31 in the state in which the dial 10 is located at the home position, and also configured such that the biasing portion 35a thereof is arranged so as to contact the front end P1 of the rotational-side guide face 24a in this state.

As shown in FIG. 12, the D-range-side curve face 24a_D and the R-range-side curve face 24a_R are configured such that respective distances thereof from the rotational center O become shorter as being further apart from the front end P1. Accordingly, the biasing portion 35a advances the most from the leg body portion 35b in the state of its contacting the front end P1 of the rotational-side guide face 24a, and retreats more as being further apart from the front end P1. Thus, as the biasing portion 35a retreats more, it is pressed by the compressive spring against the rotational-side guide face 24a with a stronger pressing force. This pressing force is transferred to a force to return the biasing portion 35a to the front end P1. Therefore, in a state in which the operational force (the force for rotating the rod 30 and the dial 10) of the driver's hand is not applied to the biasing portion 35a (the rod 30 and the dial 10), the biasing portion 35a is held at the position where the biasing portion 35a contacts the front end P1 of the rotational-side guide face 24a, so that the dial 10 is held at the home position. Then, when applying of the operational force is released after the dial 10 located at the home position is rotated by receiving the operational force and therefore the biasing portion 35a is moved to the position where the biasing portion 35a is apart from the front end P1, the biasing portion 35a is returned by the force of the compressive spring to the position where the basing portion 35a contacts the front end P1, so that the dial 10 is automatically returned to the home position.

In the present embodiment, as shown in FIG. 12, the curvature of the D-range-side curve face 24a_D is configured to be larger than that of the R-range-side curve face 24a_R. That is, in FIG. 12, a line L_R illustrated by a one-dotted broken line is the one which has the same curvature of the R-range-side curve face 24a_R, and the D-range-side curve face 24a_D is located at a position which is closer to the rotational center O than the line L_R.

As described above, reaction forces of the compressive spring are applied to the biasing portion 35a, i.e., the rod 30 and the dial 10, as the biasing portion 35a moves further apart from the front end P1. This reaction force functions as a resistant force against the rotational operation of the dial 10. That is, the driver cannot rotate the dial 10 unless any stronger force than the reaction force of the compressive spring is applied by the driver. And, the reaction force of the compressive spring, i.e., the resistant force, becomes larger as the biasing portion 35a retreats more.

Therefore, since the curvature of the D-range-side curve face 24a_D is configured to be larger than that of the R-range-side curve face 24a_R as described above in the present embodiment, the retreating amount of the biasing portion 35a in the case in which the biasing portion 35a moves along the D-range-side curve face 24a_D, that is—when the dial 10 is rotated clockwise, is larger, so that the operational force necessary to rotate the dial 10 clockwise from the home position is larger than the operational force necessary to rotate the dial 10 counterclockwise.

Next, the slide-side momentary mechanism and the slide-side guide face 55a will be described.

Figure 13A:
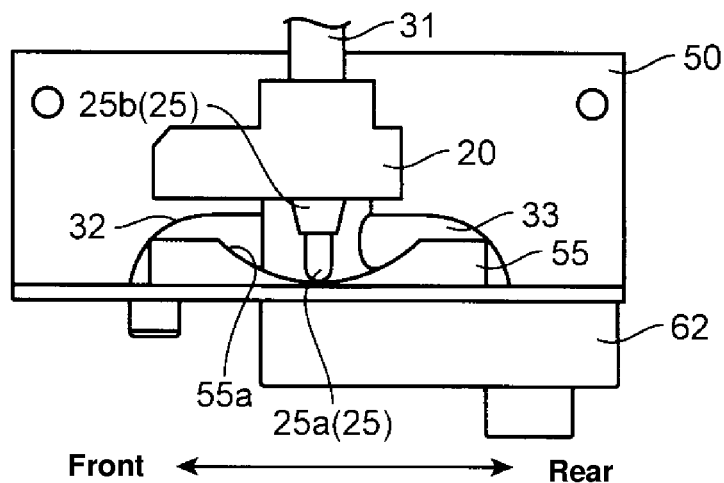
FIGS. 13A, 13B and 13C are side views showing the inside of the body portion of the shift device in the different states.
Figure 13B:
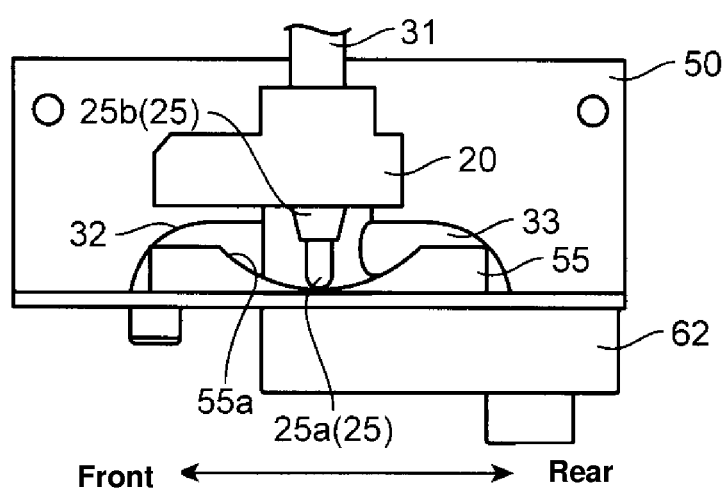
Figure 13C:
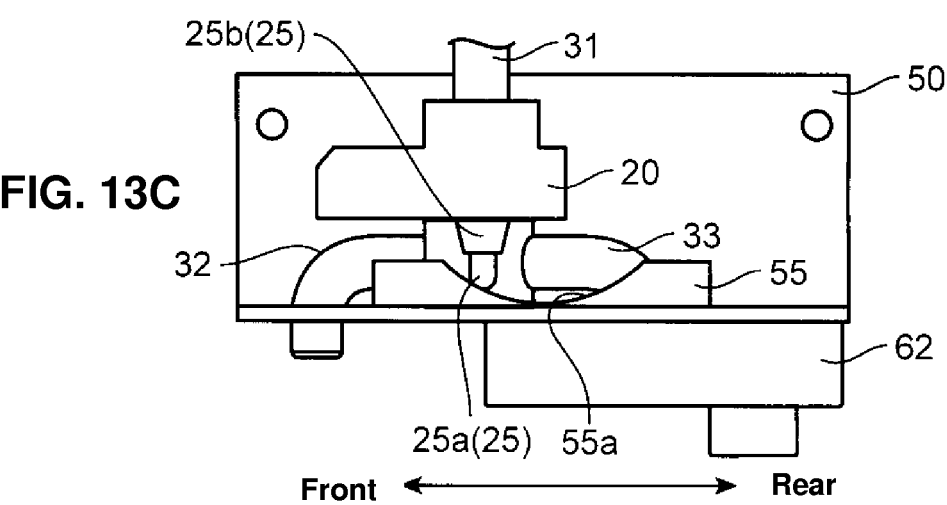
Figure 14:
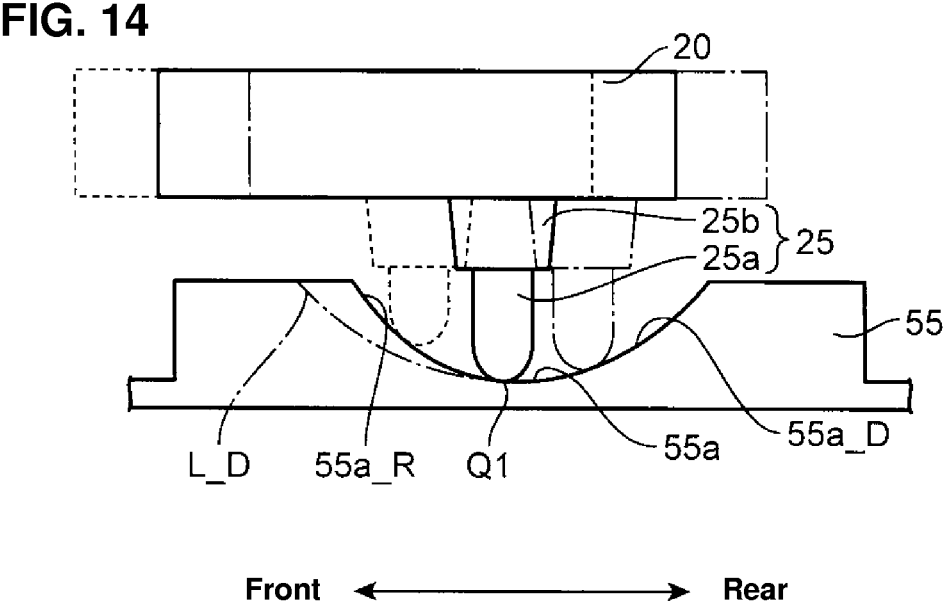
FIG. 14 is a side view describing details of a slide-side guide member.

FIGS. 13A-13C correspond to FIGS. 9A-9C, FIGS. 10A-10C and FIGS. 11A-11C and show the states of the leg portion for slide-side detent 25 when the dial 10 is rotated and slid. FIG. 14 is an enlarged view of the slide-side guide face 55a and the leg portion for slide-side detent 25. As shown in FIGS. 13B and 13C, the leg portion for slide-side detent 25 slides along the slide-side guide face 55a when the dial 10 is slid after the rotation.

As shown in FIG. 14 and described above, the slide-side guide face 55a is concaved downward and substantially hemisphere-shaped in the side view. Further, as shown in FIGS. 13A, 13B and 14, the leg portion for slide-side detent 25 is configured to contact a bottom portion Q1 of the slide-side guide face 55a in a state in which the dial 10 is not slid in the longitudinal direction. Accordingly, the biasing portion 25a of the leg portion for slide-side detent 25 advances the most from the leg body portion 25b in the state of its contacting the bottom portion Q1 of the slide-side guide face 55a, and retreats more as being further apart from the bottom portion Q1. Therefore, in a state in which the operational force (the force for sliding the rod 30 and the dial 10) of the driver's hand is not applied to the biasing portion 25a (the rod 30 and the dial 10), the biasing portion 25a is held at the position where the biasing portion 25a contacts the bottom portion Q1 of the slide-side guide face 55a, so that the dial 10 is held at the home position. Then, when applying of the operational force is released after the dial 10 located at the home position is slid by receiving the operational force and therefore the biasing portion 25a is moved to the position where the biasing portion 25a is apart from the bottom portion Q1, the biasing portion 25a is returned by the force of the compressive spring to the position where the basing portion 25a contacts the bottom portion Q1, so that the dial 10 is automatically returned to the home position.

In the present embodiment, as shown in FIG. 14, the slide-side guide face 55a is configured to have different curvatures at its front-side portion before the bottom portion Q1 and its rear-side portion after the bottom portion Q1. Specifically, the curvature of an R-range-side curve face 55a_R which extends forward from the bottom portion Q1 is configured to be larger than that of a D-range-side curve face 55a_D which extends rearward. That is, in FIG. 14, a line L_D illustrated by a one-dotted broken line is the one which has the same curvature of the D-range-side curve face 55a_D, and the R-range-side curve face 55a_R is located at a position which is above the line L_D.

Therefore, because of operations which are similar to those described above regarding relationships of the leg portion for rotational-side detent 35 and the rotational-side guide face 24a, the retreating amount of the biasing portion 25a in the case in which the biasing portion 25a moves along the R-range-side curve face 55a_R, that is—when the dial 10 is slid forward, is larger, so that the operational force necessary to slide the dial 10 forward is larger than the operational force necessary to slide the dial 10 rearward.

[Control System]

Figure 15:
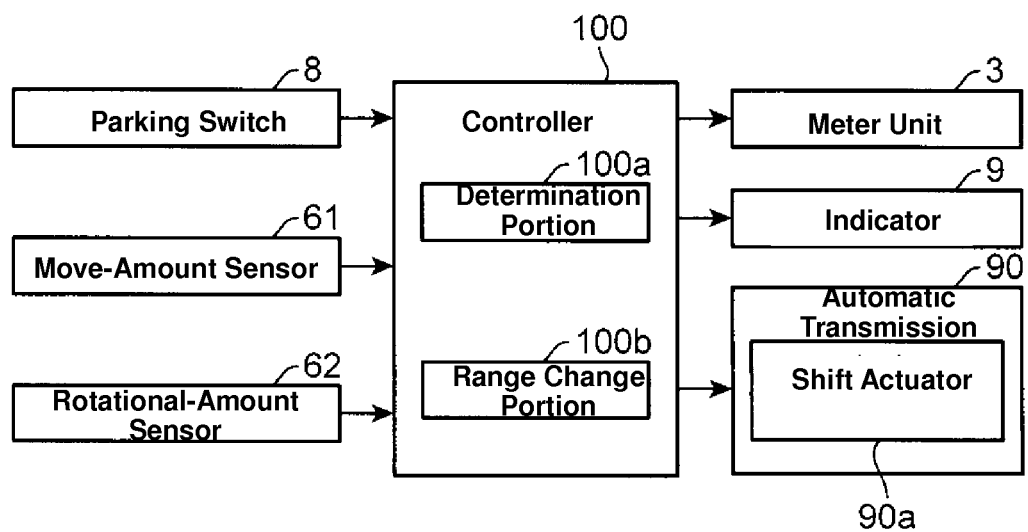
FIG. 15 is a block diagram showing a control system of the shift control device including the shift device and a controller.

FIG. 15 is a block diagram showing a control system of the shift control device of the first embodiment, including the shift device 1 and a controller 100. The controller 100 shown in this figure is a microcomputer comprising well-known CPU, RAM, ROM and others, and performs functions of controlling shifting of the automatic transmission 90 according to the operational states of the shift device 1. While the controller 100 is shown as a single and integrated block in FIG. 15, it may be comprised of plural microcomputers which are separately provided on a vehicle-body side and a side of the automatic transmission 90.

The controller 100 is electrically coupled to the above-described parking switch 8, move-amount sensor 61, rotational-amount sensor 62, automatic transmission 90 (a shift actuator 90a provided therein, specifically), indicator 9 and meter unit 3. Herein, the shift actuator 90a of the automatic transmission 90 means solenoid (electromagnetic) valves to switch connection/disconnection of frictional elements stored in the automatic transmission 90, such as clutches or brakes, for example.

The controller 100 functionally includes a determination portion 100a and a range change portion 100b.

The determination portion 100a determines operational states of the dial 10. Specifically, the determination portion 100a determines based on a signal from the rotational-amount sensor 62 whether the dial 10 is rotated from the home position or not. Further, the determination portion 100a determines based on a signal from the move-amount sensor 61 whether the dial 10 is moved forward or not and whether the dial 10 is moved rearward or not.

The range change portion 100b performs changing of the shift range of the automatic transmission 90 based on the operation states of the dial 10 determined by the determination portion 100a.

When it is determined by the determination portion 100a that the dial 10 is rotated from the home position by a specified amount of rotation, the range change portion 100b changes the shift range to the neutral range. In the present embodiment, when the determination portion 100a determines that the dial 10 is rotated by the specified rotational amount regardless of the rotational direction (clockwise or counterclockwise), the shift range is changed to the neutral range by the range change portion 100b. Herein, in the present embodiment, the above-described specified rotational amount is set to be almost equal to a rotational amount of the dial 10 which is rotated from the home position to the position where the leg portions for guide 32, 33 of the rod 30 contact the respective end portions of the rotational-side grooves 52a, 53a of the rod guide grooves 52, 53.

When it is determined by the determination portion 100a that the dial 10 is slid forward by a specified amount of slide or more from its rotated position, the range change portion 100b changes the shift range to the reverse range. Meanwhile, when it is determined by the determination portion 100a that the dial 10 is slid rearward by a specified amount of slide from its rotated position, the range change portion 100b changes the shift range to the reverse range. In the present embodiment, the above-described specified slide amount is set to be almost equal to a slide amount of the dial 10 which is rotated from its rotated position to the position where the leg portions for guide 32, 33 of the rod 30 contact the front ends of the R-range-side grooves 52b, 53b of the rod guide grooves 52, 53 and the rear ends of the D-range-side grooves 52c, 53c of the rod guide grooves 52, 53.

The controller 100 further performs controls of changing indications of the indicator 9 and the meter unit 3 according to the changing of the shift range (control of indicating the current shift range).

[Operations and Others]

As described above, according to the shift control device of the first embodiment, the shift range is changed to the neutral range by the dial 10 being rotated clockwise or counterclockwise from the home position, and the shift range is changed to the reverse range or the drive range by the dial 10 being slid in the longitudinal direction from its rotated position. That is, the shift control device of the first embodiment is configured such that the shift range is not changed unless the dial 10 is rotated.

Accordingly, even if an unexpected force is applied to the dial 10 because of inadvertent touching of a hand with the dial 10 or the like, the changing of the shift range is attained only when the magnitude of the applied force and the application position of the force are equal to the ones necessary to provide the dial 10 with an effective rotational torque. Thereby, any unexpected changing of the shift range can be restrained surely, so that the safety of the vehicle can be improved.

For example, if a device in which the shift range is changed by the driver's sliding the operational member is used, the operational member is slid and thereby the shift range is changed as long as a specified force for sliding the operational member is applied to any portion of the operational member. By contrast, according to the shift control device of the present embodiment, even when a specified force is applied to the dial 10, any rotation of the dial 10 can be properly prevented in a case in which the application position of the force is too close to the rotational center O of the dial 10. Moreover, even if the dial 10 is rotated inadvertently, the shift range is changed only to the neutral range and also the shift range is not changed to the traveling range unless the dial 10 is further moved in the longitudinal direction after this rotation, so that any unexpected forward or backward traveling of the vehicle can be restrained in the present invention.

Further, according to the shift control device of the present embodiment, the dial 10 is arranged on the right side of the driver and also the shift range is changed to the reverse range by rotating the dial 10 in the counterclockwise direction where it is difficult to rotate the driver's wrist. Thereby, it can be restrained surely that the shift range is unexpectedly changed to the reverse range which may require paying attention to its changing particularly.

Figure 16A:
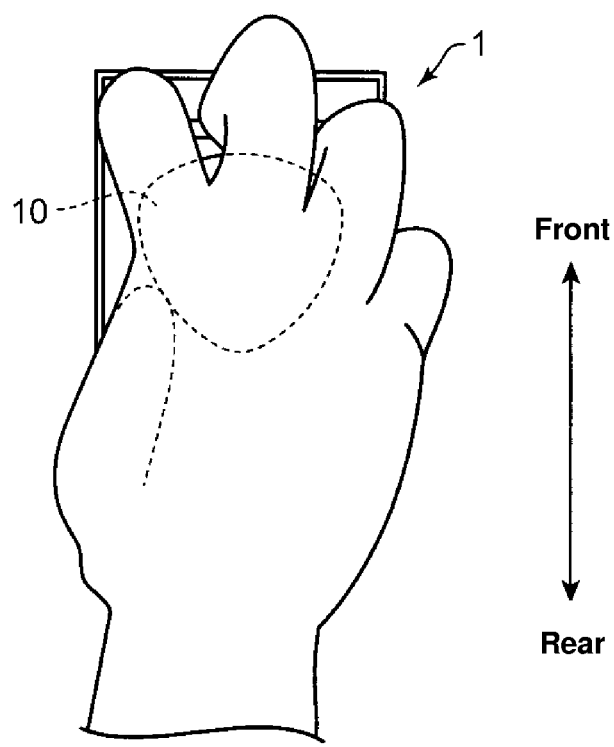
FIGS. 16A and 16B are diagrams showing a hand in different states.
Figure 16B:
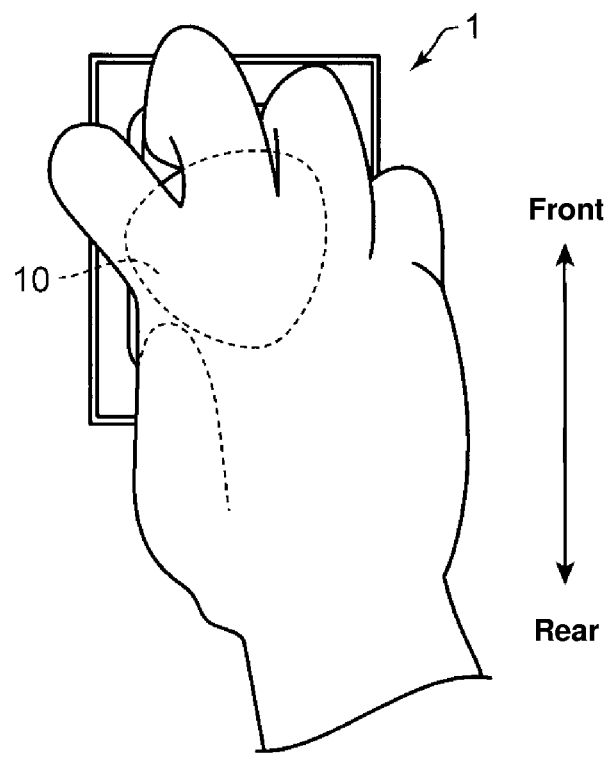

Specifically, as shown in FIG. 16A, in a state in which the dial 10 is arranged on the right side of the driver, the driver generally operates the dial 10 with the right hand. Herein, when the dial 10 arranged on the right side is rotated counterclockwise by the driver's right hand, the driver rotates the right hand toward the driver's body as shown in FIG. 16B. Herein, a movable range (rotatable range) of a joint of the driver's wrist in the case of rotating the hand toward the body is smaller than that in a case of rotating the hand in the opposite direction (being further from the body). Specifically, it is generally said that the movable range of the joint of the wrist in the case of rotation toward the body (inward) is about 0-25 degrees, whereas that in the case of rotation in the opposite direction (outward) is about 0-55 degrees. Accordingly, in the above-described arrangement of the dial 10, it is relatively difficult to rotate the dial 10 counterclockwise. Further, according to the shift control device of the present embodiment, the direction of changing the shift range to the reverse range is set at this direction, so that it can be restrained more surely that the shift range is unexpectedly changed to the reverse range.

Herein, since it is relatively difficult to rotate the dial 10 counterclockwise in the state of the dial 10 being arranged on the right side of the driver as described above, if the operational force necessary for this counterclockwise rotation of the dial 10 is set to be considerably large, the operability of the rotational operation of the dial 10 may deteriorate extremely. By contrast, in the shift device 1 of the present embodiment, the curvature of the D-range-side curve face 24a_D which is positioned on the clockwise-direction side of the rotational-side guide face 24a is configured to be larger than that of the R-range-side curve face 24a_R which is positioned on the counterclockwise-direction side of the rotational-side guide face 24a, so that the operational force necessary to rotate the dial 10 counterclockwise from the home position can be relatively small. Thereby, as described above, the operability of the dial 10 to be operated for the reverse range can be ensured, preventing the erroneous changing of the shift range to the reverse range properly.

Further, since the operational forces necessary to rotate the dial 10 are different from each other in the rotational directions of the dial 10, i.e., a reverse-range direction and a drive-range direction, the driver can be made to recognize surely whether the operational direction is the reverse-range direction or the drive-range direction when rotating the dial 10. Accordingly, it can be restrained that the driver changes the shift range erroneously.

Moreover, in the shift device 1 of the present embodiment, the curvature of the R-range-side curve face 55a_R which is positioned on the front side of the slide-side guide face 55a is configured to be larger than that of the D-range-side curve face 55a_D which is positioned on the rear side of the slide-side guide face 55a, so that the operational force necessary to slide the dial 10 forward is set to be relatively large and the shift range is changed to the reverse range by moving the dial 10 forward. Thereby, it can be prevented more surely that the shift range is unexpectedly changed to the reverse range which may require paying attention to its changing particularly, so that the safety of the vehicle can be improved more.

Additionally, since the shift control device of the present embodiment is configured such that the shift range is changed to the reverse range by sliding the dial 10 forward, the safety can be improved by setting the operational force necessary to slide the dial 10 for changing to the reverse range to be large, thereby improving the safety, and also the slide operation of the dial 10 for changing to the reverse range can be easier. That is, it is easier to apply the operational force for pushing the dial 10 forward, so that the dial 10 can be operated for changing to the reverse range more easily by configuring as described above.

While the above-described first embodiment describes the case in which the dial 10 is arranged on the right side of the driver, the dial 10 may be arranged on the left side of the driver. And, while the first embodiment describes the case in which the rotational direction of the dial 10 for changing to the reverse range is set to be the direction where the movable range of the joint of the wrist is relatively narrow, the rotational direction of the dial 10 for changing to the reverse range may be set at the direction where the movable range of the joint of the wrist is relatively wide.

This case will be described next.

Embodiment 2

Figure 17:
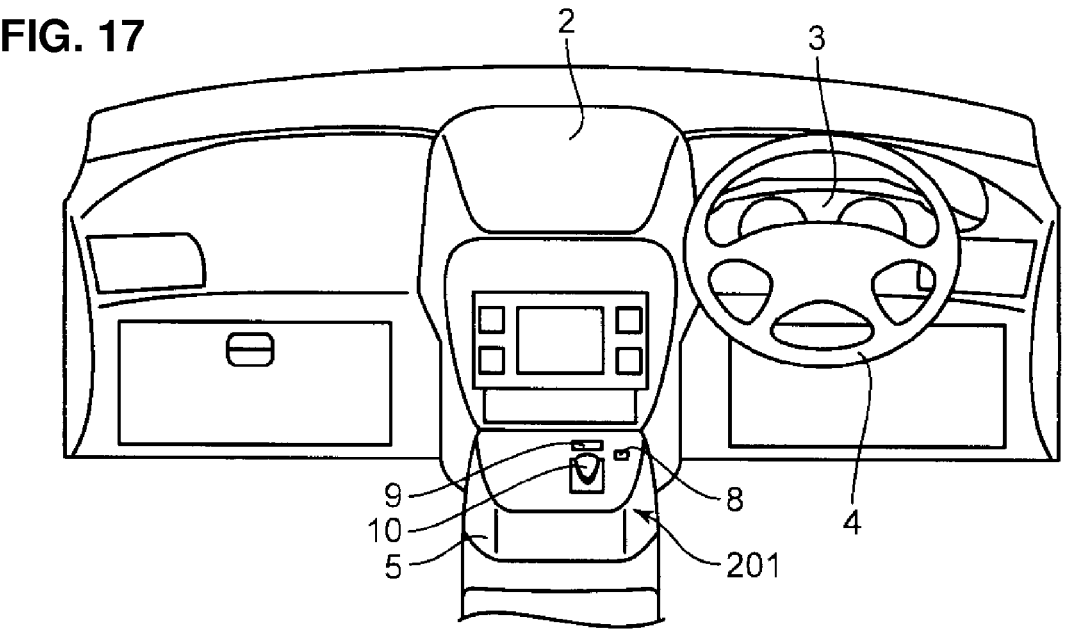
FIG. 17 is a diagram showing the structure of the vehicle-compartment front portion of the vehicle which is equipped with a shift device of a shift control device according to a second embodiment of the present invention.
Figure 18:
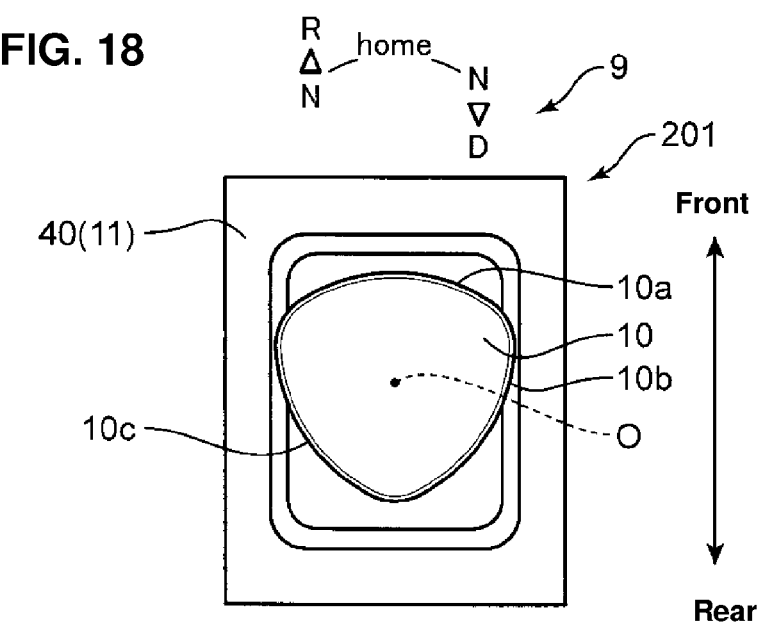
FIG. 18 is a plan view of the shift device and its surrounding portion according to the second embodiment.
Figure 19:
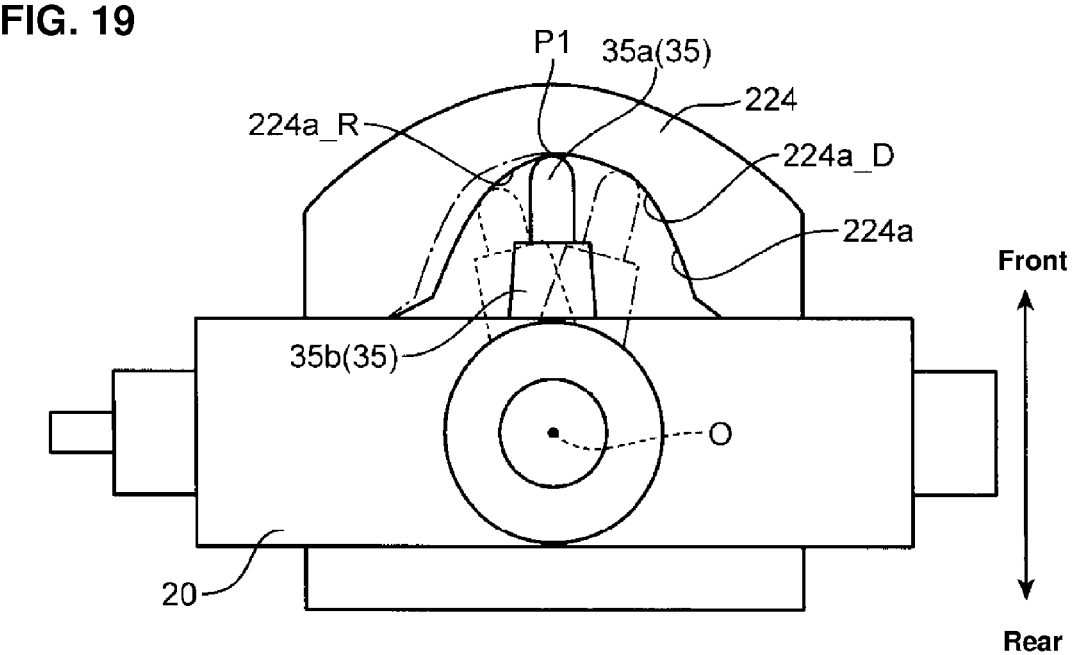
FIG. 19 is an enlarged plan view showing a slide block and its surrounding portion according to the second embodiment.

FIGS. 17, 18 and 19 show another embodiment (second embodiment) in which the dial 10 is arranged on the left side of the driver. As shown in FIG. 17, the vehicle according to the second embodiment is a so-called right-handle vehicle in which the driver's seat and the steering wheel 4 are provided on the right side of the vehicle. A shift device 201 which constitutes part of a shift control device for a vehicle according to the second embodiment is arranged on the center console 5 which is provided on the left side of the driver's seat, and this shift device 201 is operated by the driver with the left hand.

The shift device 201 of the second embodiment is different from the shift device 1 of the first embodiment only in the shape of a rotational-side guide face 224a of a rotational-side guide member 224. The other structures are the same. Hereinafter, only the shape of the rotational-side guide face 224a will be described.

In the second embodiment, as shown in FIG. 19, the curvature of the R-range-side curve face 224a_R which is positioned on the counterclockwise side (left side) from the front end P1 of the rotational-side guide face 224a is configured to be larger than that of the D-range-side curve face 224a_D which is positioned on the clockwise side (right side) from the front end P1 of the rotational-side guide face 224a, differently from the first embodiment. For example, the rotational-side guide face 224a of the second embodiment has a shape which is formed by inverting the rotational-side guide face 24a of the first embodiment symmetrically.

Accordingly, in the second embodiment, the operational force necessary to rotate the dial 10 clockwise from the home position for changing to the drive range is smaller than the operational force necessary to rotate the dial 10 in the opposite direction. Thus, according to the second embodiment, the dial 10 is arranged on the left side of the driver and also the operational force of the rotation in the clockwise direction, i.e., in the direction where the movable (rotatable) angle of the wrist is so small that the operation is relatively difficult, is set to be relatively small. Thereby, the operability of the rotational operation of the dial 10 in this direction can be ensured properly.

Herein, the second embodiment is configured such that the relative magnitude of the operational force of the rotational direction is set oppositely to the first embodiment, whereas the rotational directions for changing to the reverse range and the drive range are set similarly to the first embodiment as shown in FIG. 18. That is, in the second embodiment as well, the shift range is changed to the reverse range by rotating the dial 10 counterclockwise from the home position and then sliding the dial 10 forward, whereas the shift range is changed to the drive range by rotating the dial 10 clockwise from the home position and then sliding the dial 10 rearward. Further, the operational operation of the dial 10 for changing to the reverse range is configured to be easier in terms of the movable range of the joint. However, the operational force necessary for the rotational operation for changing the reverse range (in the counterclockwise direction) of the second embodiment is set to be large as described above, so that it can be restrained that the shift range is unexpectedly changed to the reverse range.

Other Modifications

While the above-described first and second embodiments describe the case in which the operational forces necessary for rotating the dial 10 are set to be different from each other in the direction of the rotation of the dial 10, these operational forces may be set to be the same regardless of the operational direction. However, since the above-described different setting can make the driver recognize surely whether the operational direction is the reverse-range direction or the drive-range direction, it can be restrained that the driver changes the shift range erroneously.

Further, in the case in which, as the second embodiment, the direction of the rotational operation for changing to the reverse range which may require paying attention to its changing particularly is set at the direction (the counterclockwise direction in the second embodiment) where the movable range of the wrist is so wide that the operational operation is easier, it is preferable that the operational force necessary for this rotational operation be set to be larger than the operational force necessary for the opposite-direction rotational operation, so that it can be restrained more surely that the shift range is unexpectedly changed to the reverse range.

Also, while the above-described first and second embodiments describe the case in which the slide directions of the dial 10 are set to be different from each other in the direction of the rotation of the dial 10, these slide directions may be set to be the same regardless of the rotational direction. However, since the above-described different setting can make the driver recognize easily whether the shift range is changed to the reverse range or the drive range.

In the above-described first and second embodiments, the rotational directions for changing to the reverse range and the drive range may be set to be different from each other.

The specific constitution of the dial 10 is not to be limited to the above-described one.

While the above-described embodiments exemplified the case in which the dial 10 has the rotational angle of 15°, the specific angle is not to be limited to the angle of 15°. However, it is preferable that this angle be set to be 90° or smaller for the easy rotational operation.

Moreover, while the above-described embodiments are configured such that the operational forces necessary to rotate the dial 10 are differentiated for each rotational direction by differentiating the shapes of the rotational-side guide faces 24a, 224a in the clockwise direction and the counterclockwise direction, the specific constitution for differentiating the operational forces in the rotational direction is not be limited to this. However, this is superior in changing the operational force by properly utilizing the rotational-side guide faces 24a, 224a which function as part of the momentary mechanism, so that the structure can be properly simple.

Similarly, while the above-described embodiments are configured such that the operational forces necessary to slide the dial 10 are differentiated for the forward slide and the rearward slide by differentiating the shapes of the front-side portion and the rear-side portion of the slide-side guide face 55a, the specific constitution for differentiating the operational forces in the slide direction is not be limited to this. However, this is superior in changing the operational force by properly utilizing the slide-side guide face 55a which functions as part of the momentary mechanism, so that the structure can be properly simple.

Additionally, while the shift control device of the above-described embodiments is the device to change the shift range of the multi-stage automatic transmission 90 provided between the engine (internal combustion engine) and the wheels, an applicable transmission of the present invention is not limited to a multi-stage automatic transmission, but to a continuously variable transmission (CVT), for example. Further, the present invention can be applied to any transmission in which a forward-traveling range and a backward-traveling range are electrically changed, like a transmission used in electric automotive vehicles.

What is claimed is:

1. A shift control device for a vehicle, comprising:
    a shift device comprising an operational member provided in a vehicle compartment and a body portion supporting the operational member rotatably, clockwise or counterclockwise, from a specified home position and movably in a vehicle longitudinal direction, forward or rearward, from a rotated position after the operational member is rotated, the body portion being configured to allow the rotated or moved operational member to return to the specified home position automatically;
    a sensor to detect rotation and move of the operational member of the shift device; and
    a controller comprising a determination portion to determine a state of the rotation and the move of the operational member detected by the sensor and a range change portion to supply signals for changing a shift range of the vehicle among a neutral range, a drive range for forward traveling, and a reverse range for backward traveling to an automatic transmission based on determination results of the determination portion,
    wherein the range change portion of said controller is configured to supply a signal for changing the shift range to the neutral range to the automatic transmission when said determination portion determines that said operational member is rotated from the home position, supply a signal for changing the shift range to either one of the drive range and the reverse range to the automatic transmission when said determination portion determines that the operational member is moved in the vehicle longitudinal direction from the rotated position after the operational member is rotated clockwise from the home position, and supply a signal for changing the shift range to the other of the drive range and the reverse range to the automatic transmission when the determination portion determines that the operational member is moved in the vehicle longitudinal direction from the rotated position after the operational member is rotated counterclockwise from the home position.

2. The shift control device for the vehicle of claim 1, wherein said operational member of the shift device is arranged between a driver's seat and a passenger's seat, said range change portion of the controller is configured to supply a signal for changing the shift range to the reverse range to the automatic transmission when said determination portion determines that the operational member is moved in the vehicle longitudinal direction from the rotated position after the operational member is rotated counterclockwise from the home position and supply a signal for changing the shift range to the drive range to the automatic transmission when the determination portion determines that the operational member is moved in the vehicle longitudinal direction from the rotated position after the operational member is rotated clockwise from the home position, and said body portion of the shift device is configured to support the operational member such that an operational force necessary for the operational member to be rotated clockwise from the home portion is smaller than an operational force necessary for the operational member to be rotated counterclockwise from the home position.

3. The shift control device for the vehicle of claim 2, wherein said body portion of the shift device is configured to support said operational member such that an operational force necessary for the operational member of the shift device to be moved in the vehicle longitudinal direction in order to change the shift range to the reverse range is larger than an operational force necessary for the operational member to be moved in the vehicle longitudinal direction in order to change the shift range to the drive range.

4. The shift control device for the vehicle of claim 3, wherein said range change portion of the controller is configured to supply a signal for changing the shift range to the reverse range to the automatic transmission when said determination portion determines that said operational member of the shift device is moved forward from the rotated position after the operational member is rotated from the home position and supply a signal for changing the shift range to the drive range to the automatic transmission when the determination portion determines that the operational member is moved rearward from the rotated position after the operational member is rotated.

5. The shift control device for the vehicle of claim 2, further comprising a rotational-side biasing means to bias said operational member of the shift device which is rotated from the home position in a direction of returning the operational member toward the home position, wherein said rotational-side biasing means is configured such that a biasing force thereof in a case in which the operational member is rotated clockwise from the home position is different from a biasing force thereof in a case in which the operational member is rotated counterclockwise from the home position.

6. The shift control device for the vehicle of claim 3, further comprising a move-side biasing means to bias said operational member of the shift device which is moved in the vehicle longitudinal direction from the rotated position after the operational member is rotated from the home position in a direction of returning the operational member toward the rotated position, wherein said move-side biasing means is configured such that a biasing force thereof in a case in which the operational member is moved forward from the rotated position is different from a biasing force thereof in a case in which the operational member is moved rearward from the rotated position.

7. The shift control device for the vehicle of claim 1, wherein said operational member of the shift device is arranged between a driver's seat and a passenger's seat, said range change portion of the controller is configured to supply a signal for changing the shift range to the reverse range to the automatic transmission when said determination portion determines that the operational member is moved in the vehicle longitudinal direction from the rotated position after the operational member is rotated counterclockwise from the home position and supply a signal for changing the shift range to the drive range to the automatic transmission when the determination portion determines that the operational member is moved in the vehicle longitudinal direction from the rotated position after the operational member is rotated clockwise from the home position, and said body portion of the shift device is configured to support the operational member such that an operational force necessary for the operational member to be rotated counterclockwise from the home portion is an operational force necessary for the operational member to be rotated clockwise from the home position or smaller.

8. The shift control device for the vehicle of claim 7, wherein said body portion of the shift device is configured to support said operational member such that an operational force necessary for the operational member of the shift device to be moved in the vehicle longitudinal direction in order to change the shift range to the reverse range is larger than an operational force necessary for the operational member to be moved in the vehicle longitudinal direction in order to change the shift range to the drive range.

9. The shift control device for the vehicle of claim 8, wherein said range change portion of the controller is configured to supply a signal for changing the shift range to the reverse range to the automatic transmission when said determination portion determines that said operational member of the shift device is moved forward from the rotated position after the operational member is rotated from the home position and supply a signal for changing the shift range to the drive range to the automatic transmission when the determination portion determines that the operational member is moved rearward from the rotated position after the operational member is rotated.

10. The shift control device for the vehicle of claim 7, further comprising a rotational-side biasing means to bias said operational member of the shift device which is rotated from the home position in a direction of returning the operational member toward the home position, wherein said rotational-side biasing means is configured such that a biasing force thereof in a case in which the operational member is rotated clockwise from the home position is different from a biasing force thereof in a case in which the operational member is rotated counterclockwise from the home position.

11. The shift control device for the vehicle of claim 8, further comprising a move-side biasing means to bias said operational member of the shift device which is moved in the vehicle longitudinal direction from the rotated position after the operational member is rotated from the home position in a direction of returning the operational member toward the rotated position, wherein said move-side biasing means is configured such that a biasing force thereof in a case in which the operational member is moved forward from the rotated position is different from a biasing force thereof in a case in which the operational member is moved rearward from the rotated position.

* * * * *